US012628735B2

(12) United States Patent
Chikaraishi et al.

(10) Patent No.: US 12,628,735 B2
(45) Date of Patent: May 19, 2026

(54) ELECTRICAL DEVICE

(71) Applicant: MAKITA CORPORATION, Anjo (JP)

(72) Inventors: Makoto Chikaraishi, Anjo (JP);
Tatsuya Kobayashi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 419 days.

(21) Appl. No.: 18/333,141

(22) Filed: Jun. 12, 2023

(65) Prior Publication Data

US 2024/0000008 A1      Jan. 4, 2024

(30) Foreign Application Priority Data

Jul. 4, 2022    (JP) ................................. 2022-107837

(51) Int. Cl.
*A01D 34/82*         (2006.01)
*A01D 34/00*         (2006.01)
(Continued)

(52) U.S. Cl.
CPC ........... *A01D 34/82* (2013.01); *A01D 34/008* (2013.01); *F21S 43/26* (2018.01); *F21S 43/30* (2018.01);
(Continued)

(58) Field of Classification Search
CPC .......... A01D 34/82; F21S 43/26; F21S 43/30; G08B 5/38; B60Q 2800/10; B60Q 2800/20; B60Q 1/543
See application file for complete search history.

(56) References Cited

U.S. PATENT DOCUMENTS 6,774,596 B1 *   8/2004   Bisset .................. G05D 1/0255
                                                                    318/565
8,417,383 B2 *   4/2013   Ozick ................... A47L 9/2826
                                                                    700/258
(Continued)

FOREIGN PATENT DOCUMENTS

JP          H11-249131 A         9/1999
JP          2003-501120 A        1/2003
(Continued)

OTHER PUBLICATIONS

Jan. 27, 2026 Office Action issued in Japanese Patent Application No. 2022-107837.

*Primary Examiner* — Olga V Merkoulova
(74) *Attorney, Agent, or Firm* — OLIFF PLC.

(57) ABSTRACT

An electrical device may be configured to operate on supplied electric power. The electrical device may include a display configured to display a state related to the electrical device, a control device configured to control the electrical device, and a power supply configured to supply electric power to the electrical device. The display may include: a housing including a housing body, an opening, and a transmissive member, in which the opening is defined through the housing body and the transmissive member covers the opening; a light source device housed in the housing and configured to emit visible light; and a reflector housed in the housing and having a reflective surface configured to reflect the visible light emitted from the light source device toward the opening. The control device may be configured to control the light source device according to the state related to the electrical device.

18 Claims, 12 Drawing Sheets

(51) Int. Cl.

| | | |
|---|---|---|
| *F21S 43/20* | (2018.01) |
| *F21S 43/30* | (2018.01) |
| *A01D 34/78* | (2006.01) |
| *A01D 101/00* | (2006.01) |
| *G08B 5/38* | (2006.01) |

(52) U.S. Cl.

CPC .......... *A01D 34/78* (2013.01); *A01D 2101/00* (2013.01); *G08B 5/38* (2013.01)

(56) References Cited

U.S. PATENT DOCUMENTS

| | | | | |
|---|---|---|---|---|
| 8,528,157 | B2 * | 9/2013 | Schnittman | ......... A47L 11/4008 |
| | | | | 15/340.1 |
| 10,125,943 | B2 * | 11/2018 | Thiel | ....................... F21S 45/47 |
| 10,244,915 | B2 * | 4/2019 | Schnittman | ......... A47L 11/4013 |
| 10,272,828 | B2 * | 4/2019 | White | ................... A47L 9/2826 |
| 11,104,268 | B2 * | 8/2021 | White | ................... A47L 9/2852 |
| 11,378,248 | B2 * | 7/2022 | Potter | ..................... F21S 41/13 |
| 11,678,415 | B2 * | 6/2023 | Bearup | ................. H05B 45/20 |
| | | | | 700/245 |
| 11,679,713 | B2 * | 6/2023 | White | ................... A47L 9/2805 |
| | | | | 15/319 |
| 11,712,142 | B2 * | 8/2023 | Haegermarck | ......... A47L 11/24 |
| | | | | 15/319 |
| 2016/0377254 | A1 * | 12/2016 | Thiel | ....................... F21S 41/24 |
| | | | | 362/511 |
| 2018/0050634 | A1 * | 2/2018 | White | ................... A47L 7/0085 |
| 2019/0255991 | A1 * | 8/2019 | White | ................... A47L 9/2836 |
| 2021/0106196 | A1 * | 4/2021 | Haegermarck | ......... G05D 1/244 |
| 2021/0396372 | A1 * | 12/2021 | Potter | ................... F21S 41/143 |

FOREIGN PATENT DOCUMENTS

| | | | |
|---|---|---|---|
| JP | 2018-135012 | A | 8/2018 |
| JP | 2019-526857 | A | 9/2019 |
| WO | 00/73867 | A1 | 12/2000 |

* cited by examiner

FRONT    UP    RIGHT)
(REAR)   ↑    (LEFT)

LEFT        REAR
(RIGHT)  DOWN  (FRONT)

UP    RIGHT
(LEFT)

REAR            FRONT
(FRONT)         (REAR)

LEFT
(RIGHT)   DOWN

258(252)
260(252)
250(256)
262(252)
24

264
268
270
266
254
270
274

282(280)
246
292(244)
286(280)
284(280)
296(244)
294(244)

272
248(256)
276
278

UP
RIGHT
REAR
FRONT
LEFT
DOWN

UP

DOWN

FIG. 11

ELECTRICAL DEVICE

REFERENCE TO RELATED APPLICATIONS

This application claims priority from Japanese Patent Application No. 2022-107837 filed on Jul. 4, 2022. The entire content of the priority application is incorporated herein by reference.

TECHNICAL FIELD

An art disclosed herein relates to an electrical device.

BACKGROUND ART

Japanese Patent Application Publication No. 2003-501120 describes an electrical device configured to operate on supplied electric power. The electrical device includes a display configured to display a state related to the electrical device, a control device configured to control the electrical device, and a power supply configured to supply electric power to the electrical device. The display includes a housing including a housing body, an opening, and a transmissive member, in which the housing body is constituted of a material having a low visible light transmittance, the opening is defined through a portion of the housing body, and the transmissive member is constituted of a material having a high visible light transmittance and covers substantially an entirety of the opening; and a light source device housed in the housing and configured to emit visible light toward the opening. The control device is configured to control the light source device according to the state related to the electrical device.

DESCRIPTION

In the electrical device described in Japanese Patent Application Publication No. 2003-501120, the light source device is configured to emit the visible light toward the opening without using a reflector. In such a configuration, the visible light may not uniformly travel over to the opening from the light source device, resulting in non-uniform luminance on a surface on the display. Thus, the display may not be clearly visible when seen from outside the housing. The present teachings provide an art configured to improve viewability of a display when it is seen from outside a housing of the display.

An electrical device disclosed herein may be configured to operate on supplied electric power. The electrical device may comprise a display configured to display a state related to the electrical device, a control device configured to control the electrical device, and a power supply configured to supply electric power to the electrical device. The display may comprise a housing including a housing body, an opening, and a transmissive member, wherein the housing body is constituted of a material having a low visible light transmittance, the opening is defined through a portion of the housing body, and the transmissive member is constituted of a material having a high visible light transmittance and covers substantially an entirety of the opening, a light source device housed in the housing and configured to emit visible light, and a reflector housed in the housing and having a reflective surface configured to reflect the visible light emitted from the light source device toward the opening. The control device may be configured to control the light source device according to the state related to the electrical device.

Generally, visible light after it is emitted from a light source device spreads wider and wider as the visible light travels along a beam path from the light source device. In a configuration without a reflector, the beam path from the light source device to the opening is formed without any deflection therebetween. A distance between the light source device and the opening needs to be increased to lengthen the beam path from the light source device to the opening. Due to this, when the distance between the light source device and the opening cannot be increased (e.g., when a space within the housing is limited), the beam path from the light source device to the opening might not be able to be lengthened sufficiently, as a result of which the visible light from the light source device may not travel uniformly over to the opening. Contrary to this, according to the above configuration, the beam path from the light source device to the opening can be deflected by using the reflector. By deflecting the beam path from the light source device to the opening, the beam path from the light source device to the opening can be lengthened without increasing the distance between the light source device and the opening. Due to this, even when the distance between the light source device and the opening cannot be increased, the beam path from the light source device to the opening can be lengthened sufficiently, by which the visible light from the light source device can be made to travel uniformly over to the opening. Due to this, luminance on the surface of the display can be uniformized, and thus viewability of the surface when it is seen from outside the housing can be improved. In the present teachings, "beam path" means a path of visible light traveling along a light axis of the light source device. Further, of a surface of the transmissive member, a part which is exposed outside the housing through the opening will be referred to as "display surface". Further, "luminance of the display surface" means luminance of the display surface when the display surface is lit by the light source device emitting light.

BRIEF DESCRIPTION OF THE DRAWINGS

FIG. 11 schematically illustrates a configuration of a first light source device 292 according to the present embodiment.

Figure 1:
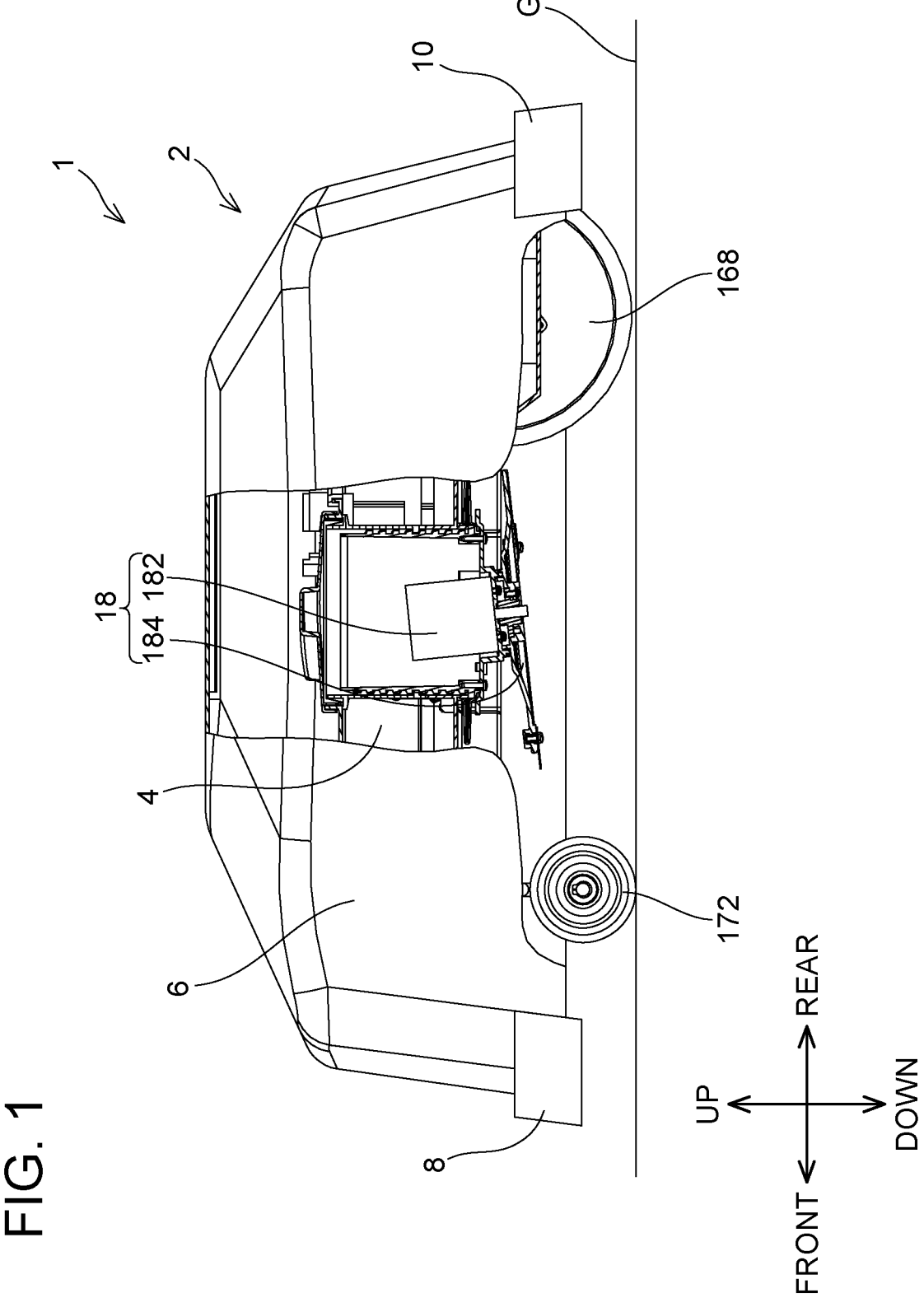
FIG. 1 illustrates an entire view of a robot lawn mower 1 according to a present embodiment as seen from the left and is also a partial cross-sectional view of an internal structure of a robot body 2.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved electrical devices as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the light source device and the opening may be adjacent to each other when viewed from the reflective surface.

For example, if the light source device and the opening overlap as they are seen from the reflective surface, the visible light after being reflected by the reflective surface (visible light reflected on the reflective surface) may be blocked by the light source device, as a result of which the visible light may not travel uniformly over to the opening. Also, if the light source device and the opening are disposed apart from each other as they are seen from the reflective surface, a space required for accommodating the light source device and the opening relatively increases, which may lead to an increase in size of the housing. According to the above configuration, the light source device can be disposed in proximity to the opening within a range that would not block the visible light reflected on the reflective surface. Due to this, the space required for accommodating the light source device and the opening can be minimized, and thus the housing can be made smaller in size.

In one or more embodiments, in a normal state of use of the electrical device, the opening may be open substantially upward and the reflective surface may be configured to reflect the visible light emitted from the light source device in a direction inclined upward with respect to a horizontal direction.

The "normal state of use of the electrical device" herein means a state of the electrical device being used in a normal posture. The "normal posture" herein refers to a state of the electrical device when it is placed on the ground or is hung on a wall.

General electrical devices (such as lawn mower robot, cleaning robot, rebar tying robot, carrier, compressor, cooler/warmer device) are typically used at a height lower than eyes of a user who is standing. Due to this, in most cases the user sees the display surface of the electrical device from above. According to the above configuration, the visible light passing through the display surface is directed to travel upward. Due to this, luminance of the display surface when seen from above can be increased. Thus, visibility of the display can be improved.

In one or more embodiments, the light source device may be below the opening and configured to emit visible light in a direction inclined downward with respect to the horizontal direction.

In the housing, there may be an extra space below the light source device. According to the above configuration, a beam path from the light source device to the opening extends toward the space below the light source device and is then deflected toward the opening positioned above the light source device. Due to this, the beam path from the light source device to the opening can be lengthened by utilizing the extra space within the housing.

In one or more embodiments, the transmissive member may be configured to diffuse the visible light.

According to the above configuration, the configuration to diffuse the visible light allows the luminance of the display surface to be uniformized. Due to this, viewability of the display surface when it is seen from outside the housing can be improved.

In one or more embodiments, the opening may include a first opening defined through the housing body along a first direction and a second opening defined through the housing body along a second direction different from the first direction and connecting with the first opening.

In cases where the above configuration is implemented, the opening may be complexly shaped, and thus it may become difficult for the visible light to travel uniformly over to the opening, as a result of which the luminance on the display surface may become non-uniform easily. Due to this, the effect of uniformizing the luminance on the display surface achieved by the present teachings is exhibited more prominently. In addition, according to the above configuration, the opening can be made seamlessly smooth in portions of the surface of the housing with height difference. Due to this, the display surface may be configured with high designability.

In one or more embodiments, the opening may have an elongated shape.

When the above configuration is implemented, the opening may be complexly shaped, and thus it may become difficult for the visible light to travel uniformly over to the opening, as a result of which the luminance on the display surface may easily become non-uniform. Due to this, the effect of uniformizing the luminance on the display surface achieved by the present teachings is exhibited more prominently. Due to this, the display surface may be configured with high designability.

In one or more embodiments, the reflective surface may extend along a shape of the opening and have a smooth shape.

For example, when the reflective surface has a shape in which plural planes are connected (that is, does not have a smooth shape), an amount of the visible light reflected on the reflective surface may easily become non-uniform. Due to this, the luminance on the display surface may become non-uniform. Contrary to this, according to the above configuration, since the reflective surface has the smooth shape, the amount of visible light reflected on the reflective surface is less likely to become non-uniform. Due to this, the luminance on the display surface can be uniformized.

In one or more embodiments, in a cross-section perpendicular to a direction in which the reflective surface extends, the reflective surface may be curved with a concave shape.

If the visible right after being reflected by the reflective surface spreads excessively wide relative to the opening, the amount of visible light passing through the display surface may be decreased. In this case, the luminance on the display surface may be decreased, and this may lead to reduced visibility of the display. According to the above configuration, the degree of the visible light spreading after being reflected by the reflective surface can be suppressed from becoming too wide. Due to this, the amount of visible light passing through the display surface can be increased. Due to this, the luminance on the display surface can be increased, by which the visibility of the display can be improved.

In one or more embodiments, the light source device may comprise a plurality of light source elements configured to emit visible light. The plurality of light source elements may be aligned along a shape of the opening.

According to the above configuration, since the plural light source elements are aligned along the shape of the opening, the visible light from the light source device can easily travel uniformly over to the opening. Due to this, the luminance on the display surface can be uniformized, and thus the viewability of the display when it is seen from outside the housing can be improved.

In one or more embodiments, the control device may be configured to switch a blinking pattern of the light source device according to the state related to the electrical device. The blinking pattern may include a first blinking pattern and a second blinking pattern different from the first blinking pattern.

According to the above configuration, display variations of the display can be increased. Due to this, the state of the electrical device can be displayed in detail.

In one or more embodiments, the control device may be configured to switch a chromaticity of the visible light emitted by the light source device according to the state related to the electrical device. The chromaticity of the visible light may include a first chromaticity and a second chromaticity different from the first chromaticity.

According to the above configuration, display variations of the display can be increased. Due to this, the state of the electrical device can be displayed in detail.

In one or more embodiments, the electrical device may further comprise a detecting mechanism configured to detect an abnormal state of the electrical device. The state related to the electrical device may include the abnormal state of the electrical device.

According to the above configuration, the abnormal state of the electrical device can be displayed. Due to this, the user can be prompted to inspect the electrical device. The "abnormal state" here means a state where the electrical device cannot continue to operate.

In one or more embodiments, the electrical device may further comprise a robot body supporting the control device, the power supply, and the display, and a transport device configured to transport the robot body. The control device may be configured to autonomously control the transport device. The electrical device may function as an autonomous mobile robot.

If the above configuration is implemented, there are cases when the electrical device may travel to a spot far away from the user by moving autonomously. When the electrical device has moved to such a spot far from the user, it becomes difficult for the user to see and read the display. Due to this, the effect of improving the visibility of the display achieved by the present application is exhibited more prominently.

In one or more embodiments, the electrical device may further comprise a mowing device supported by the robot body and configured to mow a lawn. The electrical device may function as an autonomous mobile robotic mower.

When the electrical device is a robotic mower, the electrical device may be used outdoors. In the cases where the electrical device is used outdoors, the user has difficulty in seeing and reading the display, in direct sun in particular. According to the above configuration, the effect of improving the visibility of the display achieved by the present teachings is exhibited more prominently.

EMBODIMENTS

As shown in FIG. 1, an electrical device of the present embodiment is a robot lawn mower 1 configured to be used in a state where it is placed on a lawned ground G. As will be described later, the robot lawn mower 1 is a robot configured to mow lawn while moving autonomously.

The robot lawn mower 1 comprises a robot body 2. The robot body 2 comprises a frame 4 and a body 6 supported on the frame 4. The body 6 is disposed so as to cover the frame 4 from above. A front bumper 8 is disposed at a front portion of the body 6. In the present teachings, a position of the front bumper 8 shown in FIG. 1 may be referred to as "normal position" of the front bumper 8. The front bumper 8 is attached to the frame 4 movably rearward or upward from the normal position. The front bumper 8 is biased frontward and downward relative to the frame 4 by a compression spring (not shown). The rear bumper 10 is disposed at a rear portion of the body 6. In the present teachings, a position of the rear bumper 10 shown in FIG. 1 may be referred to as "normal position" of the rear bumper 10. The rear bumper 10 is attached to the frame 4 in a state capable of moving frontward or upward from the normal position. The rear bumper 10 is biased rearward and downward relative to the frame 4 by a compression spring (not shown). In addition, the body 6 has a power switch (not shown) for turning on the power supply to the robot lawn mower 1 and an operation activating switch (not shown) for causing the robot lawn mower 1 to execute lawn cutting operation, for example, disposed thereon.

In the present teachings, a direction along which the ground G spreads will be referred to as "horizontal direction". A direction perpendicular to the ground G and oriented toward the robot lawn mower 1 from the ground G will be referred to as "up direction/upward", and a direction perpendicular to the ground G and oriented toward the ground G from the robot lawn mower 1 will be referred to as "down direction/downward". A direction perpendicular to the up and down directions and oriented toward the front bumper 8 from the rear bumper 10 will be referred to as "front direction/frontward" and a direction perpendicular to the up and down directions and oriented toward the rear bumper 10 from the front bumper 8 will be referred to as "rear direction/ rearward". A direction perpendicular to the front and rear directions and the up and down directions will be referred to as "left-right direction". In the present teachings, unless stated otherwise, descriptions are given on the premise that the robot lawn mower 1 is placed on the ground G.

Figure 2:
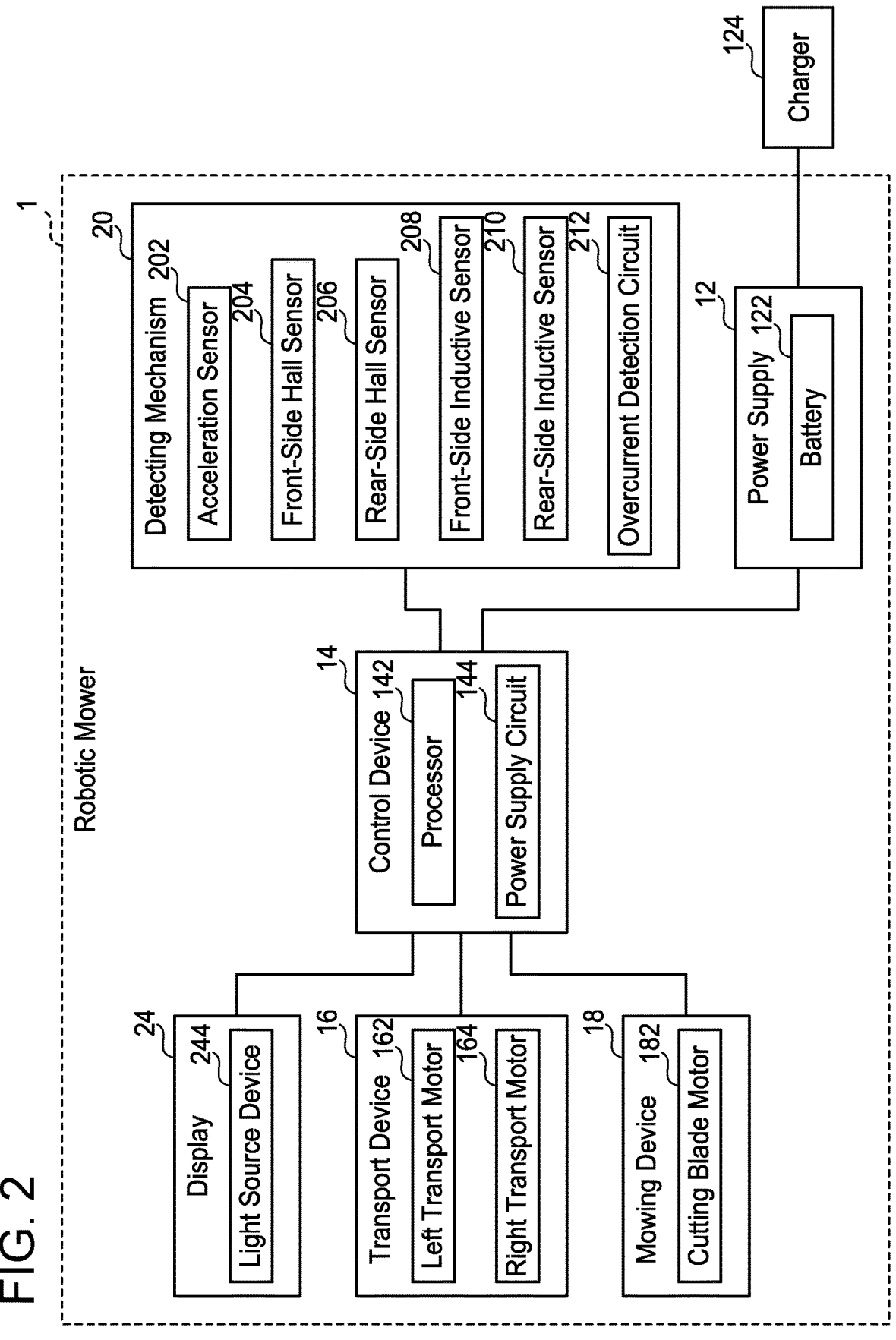
FIG. 2 schematically illustrates primary configurations of the robot lawn mower 1 according to the present embodiment.

As shown in FIG. 2, the robot lawn mower 1 comprises, mainly, a power supply 12, the control device 14, a transport device 16, a mowing device 18, a detecting mechanism 20, and a display 24. The power supply 12, the control device 14, the transport device 16, the mowing device 18, and the display 24 are supported on the robot body 2, respectively. Specifically, the power supply 12, the control device 14, the transport device 16, and the mowing device 18 are supported on the frame 4 (see FIG. 1). The display 24 is supported on an upper portion of the body 6 (see FIG. 1).

(Configuration of Power Supply 12)

The power supply 12 is configured to supply electric power to the transport device 16, the mowing device 18, the detecting mechanism 20, and the display 24 via a power supply circuit 144 of the control device 14. The power supply 12 comprises a rechargeable battery 122 such as a lithium ion battery and a connection terminal (not shown) configured to be electrically connected to the battery 122. The battery 122 of the present embodiment is incorporated in the robot body 2. The connection terminal is exposed to outside on the robot body 2 and configured to be electrically connected to a charging terminal (not shown) of a dedicated charger 124 connected to an external power source. Due to this, the battery 122 is configured chargeable by electric power supplied from the external power source via the charger 124.

(Configuration of Control Device 14)

The control device 14 comprises a processor 142 and the power supply circuit 144. The processor 142 is electrically connected to a memory such as ROM, RAM (not shown). The processor 142 (i.e., the control device 14) is configured to autonomously control operations of the power supply 12, the transport device 16, the mowing device 18, the detecting mechanism 20, and the display 24 in accordance with a predetermined program stored in the memory. The memory has settings of a lighting pattern of a light source device 244 to be described later and settings of rotary torque of a motor for cutting blade (cutting blade motor) 182, for example, stored therein.

The power supply circuit 144 is a circuit comprising a converter circuit and an inverter circuit, for example. The power supply circuit 144 is configured to supply electric power supplied from the battery 122 to the transport device 16, the mowing device 18, the detecting mechanism 20, and the display 24 respectively in accordance with instructions from the processor 142. In doing so, the power supply circuit 144 is configured to adjust the electric power supplied from the battery 122 to an appropriate level for each of the components.

(Configuration of Transport Device 16)

Figure 3:
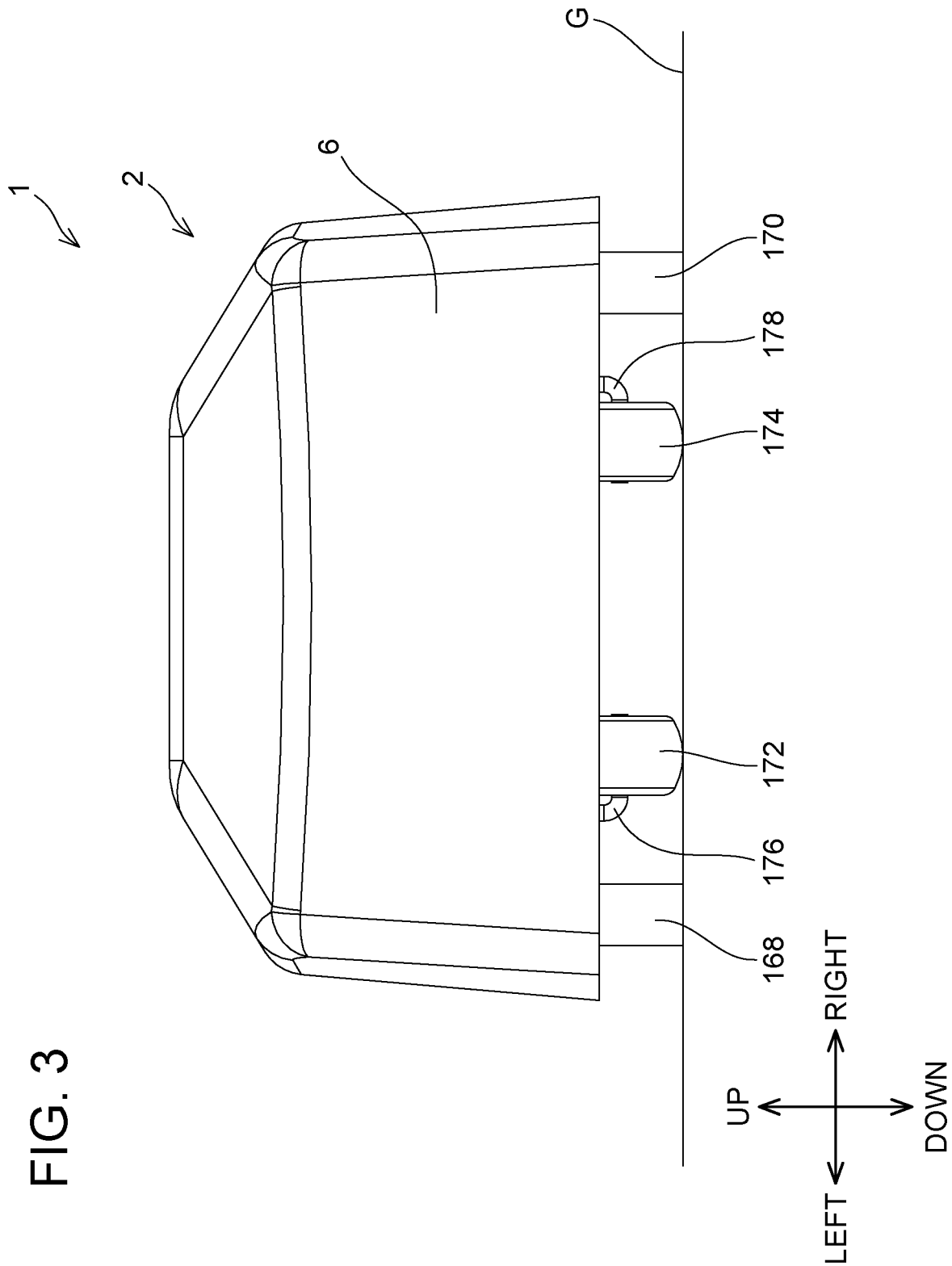
FIG. 3 illustrates the robot lawn mower 1 according to the present embodiment as seen from behind.

As shown in FIGS. 2 and 3, the transport device 16 comprises a left transport motor 162, a right transport motor 164, a left drive wheel 168, a right drive wheel 170, a left auxiliary wheel 172, a right auxiliary wheel 174, a left caster 176, and a right caster 178.

The left transport motor 162 and the right transport motor 164 are for example brushless DC motors. The left transport motor 162 and the right transport motor 164 are supported on the rear portion of the frame 4 (see FIG. 1). An output shaft of the left transport motor 162 is coupled to the left drive wheel 168. An output shaft of the right transport motor 164 is coupled to the right drive wheel 170. The left drive wheel 168 is driven to rotate around a rotary axis parallel to the left-right direction by the left transport motor 162. The right drive wheel 170 is driven to rotate around a rotary axis parallel to the left-right direction by the right transport motor 164. In the present embodiment, a rotary direction and a rotary speed of the left drive wheel 168 and a rotary direction and a rotary speed of the right drive wheel 170 are configured to be controlled independently from each other.

The left caster 176 and the right caster 178 are supported on the front portion of the frame 4 (see FIG. 1). Each of the left caster 176 and the right caster 178 is disposed rotatably around a rotary axis parallel to the up-down directions. The left auxiliary wheel 172 is attached to the left caster 176 rotatably around a rotary axis parallel to the left-right direction. The rotary axis of the left auxiliary wheel 172 rotates around the rotary axis of the left caster 176 accompanying the rotation of the left caster 176. Further, the right auxiliary wheel 174 is attached to the right caster 178 rotatably around a rotary axis parallel to the left-right direction. The rotary axis of the right auxiliary wheel 174 rotates around the rotary axis of the right caster 178 accompanying the rotation of the right caster 178.

The transport device 16 can cause the left drive wheel 168 and the right drive wheel 170 to be driven to rotate independently from each other so that the robot body 2 is to move along a desired path. Here, the left auxiliary wheel 172 and the right auxiliary wheel 174 are configured to rotate accompanying the traveling of the robot body 2, by which smooth transportation of the robot body 2 is achieved.

(Configuration of Mowing Device 18)

As shown in FIG. 1, the mowing device 18 comprises the cutting blade motor 182 and a cutting blade 184. The cutting blade motor 182 is for example a brushless DC motor. The cutting blade motor 182 is supported on the frame 4 in an inclined state where its output shaft is inclined rearward from its upper part toward its lower part. The cutting blade motor 182 is disposed between the drive wheels and the auxiliary wheels in the front-rear directions. The cutting blade 184 is fixed to the output shaft of the cutting blade motor 182. The cutting blade 184 is a so-called rotary blade shaped in a substantially disk shape. The mowing device 18 is configured to mow the lawn by rotating the cutting blade 184 by ways of driving the cutting blade motor 182.

(Configuration of Detecting Mechanism 20)

As shown in FIG. 2, the detecting mechanism 20 comprises an acceleration sensor 202, a front-side Hall sensor 204, a rear-side Hall sensor 206, a front-side inductive sensor 208, a rear-side inductive sensor 210, and an overcurrent detection circuit 212. The acceleration sensor 202 is fixed to the frame 4 (see FIG. 1). The front-side Hall sensor 204 is disposed on the front portion of the frame 4 correspondingly to the front bumper 8. The rear-side Hall sensor 206 is disposed on the rear portion of the frame 4 correspondingly to the rear bumper 10. The front-side inductive sensor 208 is disposed on the front portion of the frame 4 correspondingly to the front bumper 8. The rear-side inductive sensor 210 is disposed on the rear portion of the frame 4 correspondingly to the rear bumper 10.

The acceleration sensor 202 is configured to detect an inclination angle of the frame 4 (i.e., the robot body 2), for example, relative to the horizontal direction. The inclination angle of the frame 4 relative to the horizontal direction is 0° in the state shown in FIG. 1. The acceleration sensor 202 sends the detected inclination angle to the control device 14.

Figure 4:
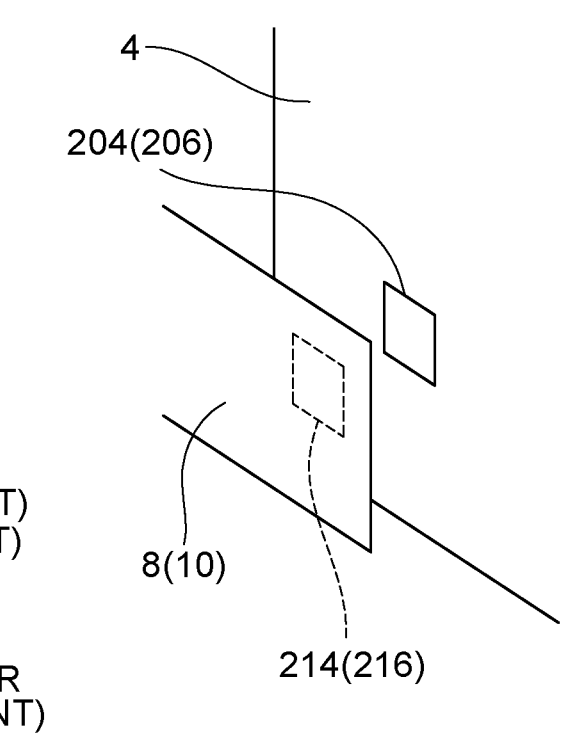
FIG. 4 schematically illustrates a configuration of a front-side Hall sensor 204 (a rear-side Hall sensor 206) according to the present embodiment.

As shown in FIG. 4, when the front bumper 8 (the rear bumper 10) is in the normal position, the front-side Hall sensor 204 (the rear-side Hall sensor 206) faces a front magnet 214 (a rear magnet 216) fixed to the front bumper 8 (the rear bumper 10) in the left-right directions. When the front bumper 8 (the rear bumper 10) moves relative to the frame 4 from the normal position, the front magnet 214 (the rear magnet 216) is moved to a position offset from the position facing the front-side Hall sensor 204 (the rear-side Hall sensor 206). The front-side Hall sensor 204 (the rear-side Hall sensor 206) is configured to detect a magnitude of a magnetic field from the front magnet 214 (the rear magnet 216). The front-side Hall sensor 204 (the rear-side Hall sensor 206) sends a H signal to the control device 14 when the magnitude of the magnetic field from the front magnet 214 (the rear magnet 216) exceeds a predetermined threshold. The front-side Hall sensor 204 (the rear-side Hall sensor 206) sends a L signal to the control device 14 when the magnitude of the magnetic field from the front magnet 214 (the rear magnet 216) is the predetermined threshold or less.

Figure 5:
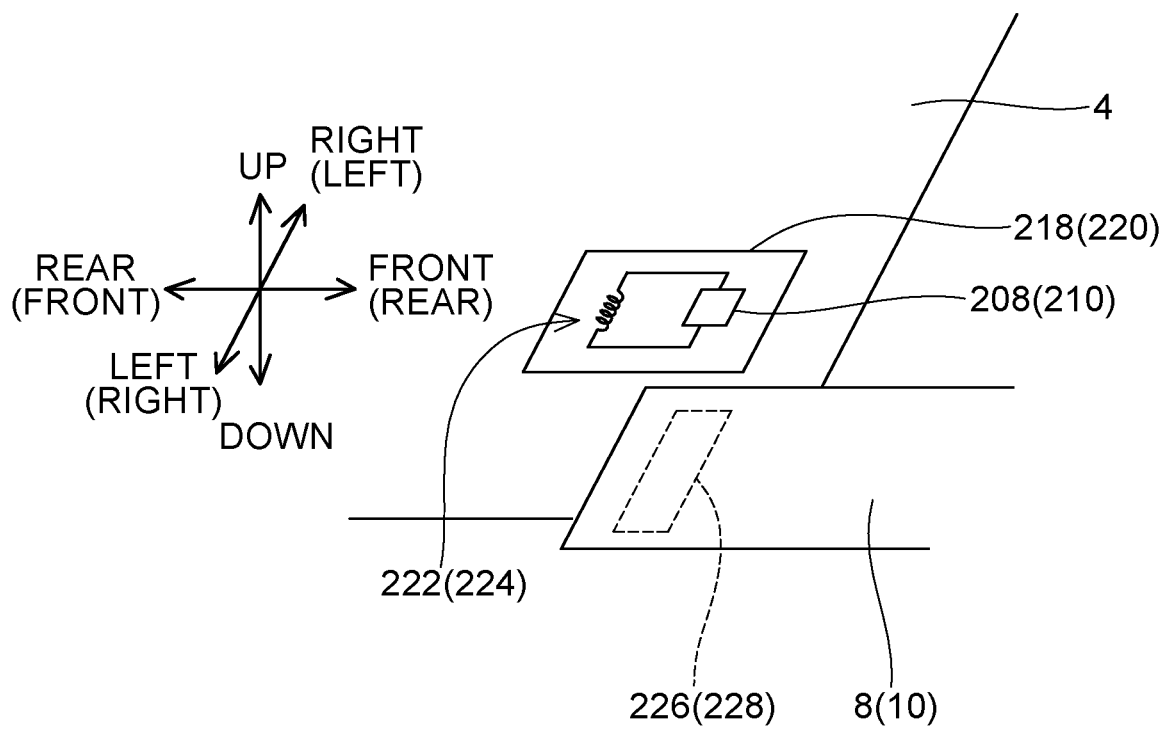
FIG. 5 schematically illustrates a configuration of a front-side inductive sensor 208 (a rear-side inductive sensor 210) according to the present embodiment.

As shown in FIG. 5, the front-side inductive sensor 208 (the rear-side inductive sensor 210) is disposed on a front sensor substrate 218 (a rear sensor substrate 220) fixed on the frame 4. A front coil pattern 222 (a rear coil pattern 224) electrically connected to the front-side inductive sensor 208 (the rear-side inductive sensor 210) is further disposed on the front sensor substrate 218 (the rear sensor substrate 220). Further, a front metal plate 226 (a rear metal plate 228) fixed on the front bumper 8 (the rear bumper 10) is arranged below the front sensor substrate 218 (the rear sensor substrate 220). The front sensor substrate 218 (the rear sensor substrate 220) and the front metal plate 226 (the rear metal plate 228) face each other in the up-down directions. When the front bumper 8 (the rear bumper 10) moves upward relative to the frame 4 from the height as the normal position, the front metal plate 226 (the rear metal plate 228) becomes closer to the front coil pattern 222 (the rear coil pattern 224). At this time, an inductance of the front coil pattern 222 (the rear coil pattern 224) changes due to mutual induction. The front-side inductive sensor 208 (the rear-side inductive sensor 210) detects whether the front bumper 8 (the rear bumper 10) has moved upward based on the change in the inductance of the front coil pattern 222 (the rear coil pattern 224). The front-side inductive sensor 208 (the rear-side inductive sensor 210) sends the H signal to the control device 14 when the front bumper 8 (the rear bumper 10) has moved upward. The front-side inductive sensor 208 (the rear-side inductive sensor 210) sends the L signal to the control device 14 when the front bumper 8 (the rear bumper 10) has not moved upward.

The overcurrent detection circuit 212 is disposed in a portion of the power supply circuit 144 of the control device 14. The overcurrent detection circuit 212 is configured to detect current values supplied to each of the left transport motor 162, the right transport motor 164, and the cutting blade motor 182. The overcurrent detection circuit 212 sends the H signal to the control device 14 when the current value supplied to the left transport motor 162 exceeds a predetermined first current threshold, when the current value supplied to the right transport motor 164 exceeds a predetermined second current threshold, or when the current value supplied to the cutting blade motor 182 exceeds a predetermined third current threshold. The overcurrent detection circuit 212 sends the L signal to the control device 14 when the current value supplied to the left transport motor 162 is the predetermined first current threshold or less, when the current value supplied to the right transport motor 164 is the predetermined second current threshold or less, or when the current value supplied to the cutting blade motor 182 is the predetermined third current threshold or less.

(Configuration of Display 24)

Figure 6:
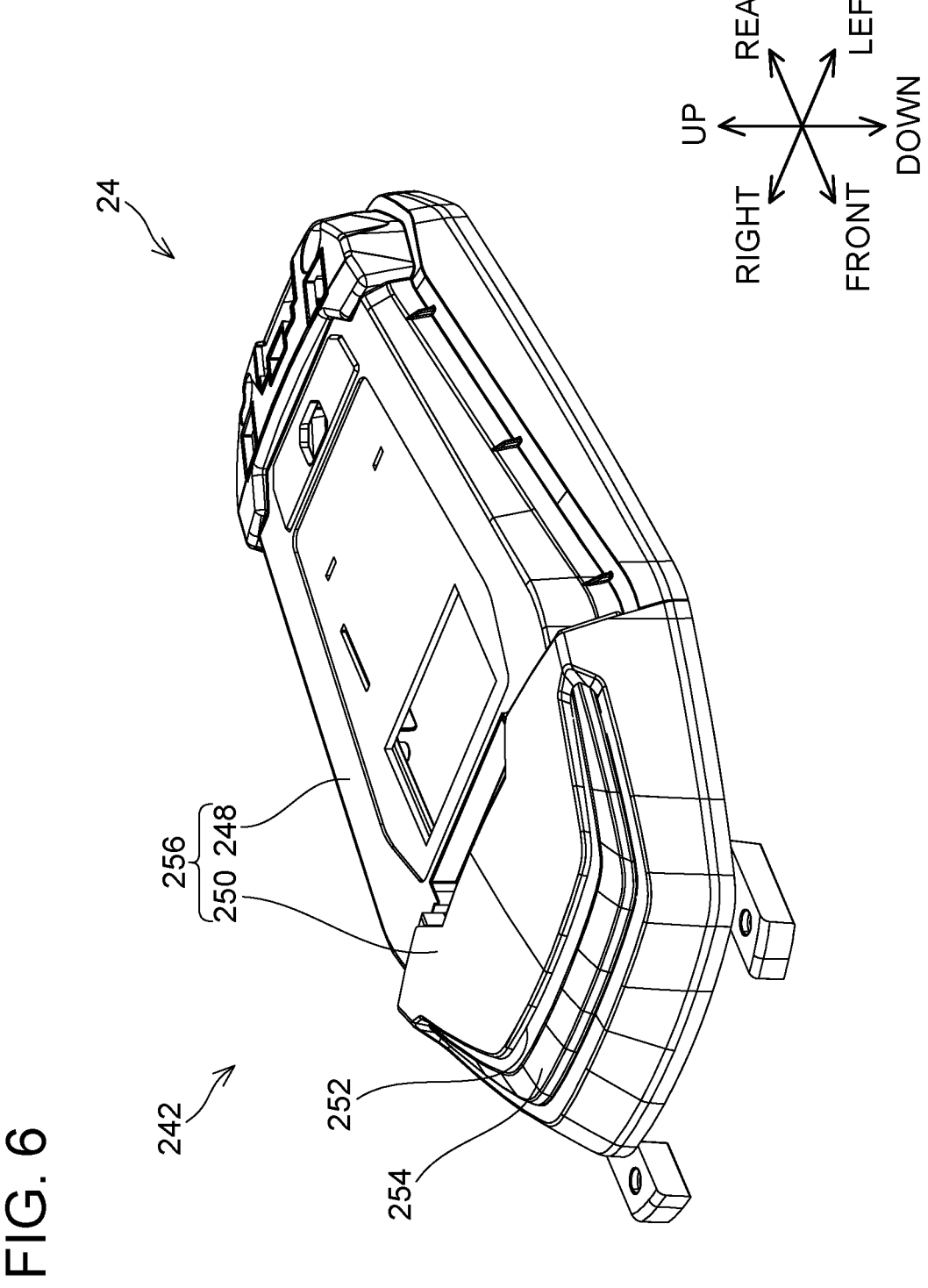
FIG. 6 illustrates an entire perspective view of a display 24 according to the present embodiment as seen from a front left upper side.
Figure 7:
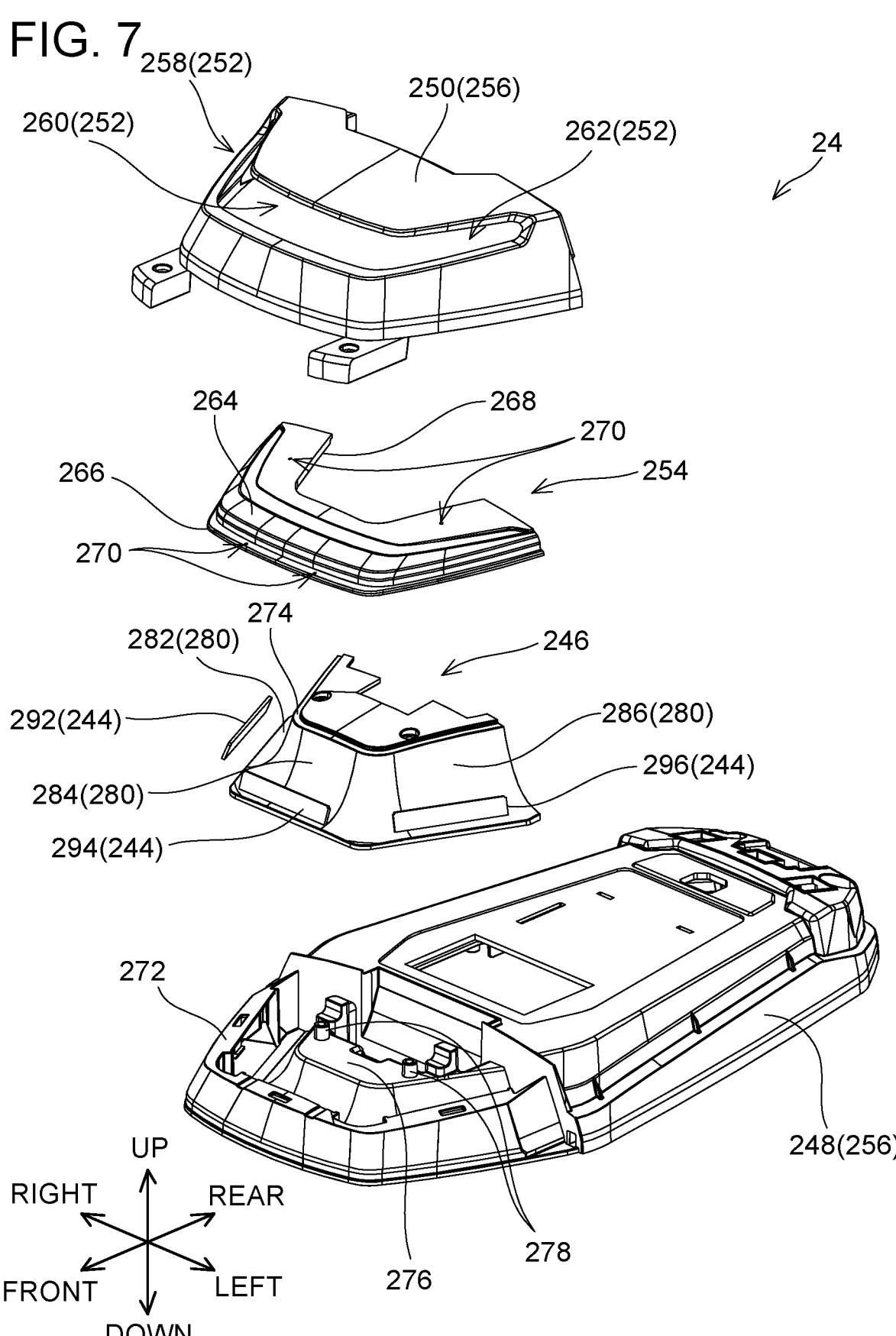
FIG. 7 illustrates an exploded view of components of the display 24 according to the present embodiment.

As shown in FIGS. 6 and 7, the display 24 comprises a housing 242, the light source device 244, and a reflector 246. The housing 242 comprises a base body 248, a cover body 250, an opening 252, and a transmissive member 254. The base body 248 is mounted on the upper portion of the body 6 of the robot body 2 (see FIG. 1). The cover body 250 is mounted on the upper portion of the body 6 by covering a front portion of the base body 248 from above. In the present teachings, the base body 248 and the cover body 250 may be collectively referred to as "housing body 256". The light source device 244 and the reflector 246 are housed in the housing body 256. The base body 248 is constituted of polycarbonate, for example. The cover body 250 is constituted of polycarbonate, for example. A visible light transmittance of the polycarbonate of which the base body 248 and the cover body 250 are constituted is 1% or less. As such, the housing body 256 is constituted of a material with a low visible light transmittance (e.g., the material the visible light remittance of which is 1% or less).

As shown in FIG. 7, the opening 252 comprises a first opening 258 defined in a first direction through a portion of the cover body 250, a second opening 260 defined in a second direction through a portion of the cover body 250, and a third opening 262 defined in a third direction through a portion of the cover body 250. The first direction is a direction which substantially coincides a direction extending from a front right upper side toward a rear left lower side. The second direction is a direction which substantially coincides a direction extending from a front upper side toward rear lower side. The third direction is a direction which substantially coincides a direction extending from a front left upper side toward rear right lower side. The opening 252 is essentially entirely open substantially upward.

The first opening 258 has an elongated shape extending from a rear right side toward a front left side. The second opening 260 has an elongated shape extending in the left-right direction. The third opening 262 has an elongated shape extending a from rear left side toward a front right side. A front portion (left portion) of the first opening 258 is connected with a right portion of the second opening 260. A left portion of the second opening 260 is connected with a front portion (right portion) of the third opening 262. The opening 252 has the elongated shape which is continuously elongated as a whole. A width in a short direction of the opening 252 is for example within a range of 10 mm to 50 mm, and in the present embodiment, is 24 mm or less at most. An opening area of the opening 252 is for example within a range of 2000 mm$^2$ (square millimeters) to 10500 mm$^2$ and in the present embodiment, 5200 mm$^2$. The "width in the short direction" herein means a width formed by a periphery of the opening 252 as the opening 252 is seen from a plane perpendicular to a direction in which the opening 252 extends. The "opening area" means an area of a plane defined by the periphery of the opening 252.

The transmissive member 254 is disposed below the cover body 250, and covers an entirety of the opening 252. An upper surface of the transmissive member 254 is shaped so as to conform to a lower surface of the cover body 250. The transmissive member 254 comprises a display surface 264, a first placement part 266, a second placement part 268, and four positioning holes 270. The display surface 264 is a surface configured to be exposed outside through the opening 252. The first placement part 266 is placed on a first placement surface 272 of the base body 248. The second placement part 268 is placed on a second placement surface 274 of the reflector 246. Each of the four positioning holes 270 is configured to receive its corresponding one of four positioning pins (not shown) of the cover body 250. Due to this, the transmissive member 254 is held by the base body 248, the cover body 250, and the reflector 246 in a state placed in position relative to the cover body 250 in the front-rear and left-right directions.

The transmissive member 254 is uniformly formed with no seams. The transmissive member 254 is constituted of acrylic, for example. A visible light transmittance of the acrylic of which the transmissive member 254 is constituted is 75% or more. As such, the transmissive member 254 is constituted of a material with a high visible light transmittance (e.g., material the visible light transmittance of which is 75% or more). Further, the transmissive member 254 is configured to diffuse the visible light. The configuration to diffuse the visible light is realized, for example, by diffusing particles having a refraction index different from the acrylic (so called diffusing material) within the transmissive member 254.

The reflector 246 is fabricated by subjecting a molded product constituted of a resin material (e.g., polycarbonate) to a surface treatment (e.g., vapor deposition) using a metal material (e.g., aluminum). The reflector 246 is attached to an island part 276 of the base body 248. In the state where the reflector 246 is mounted on the island part 276, two projections 278 projecting upward from the island part 276 are inserted into two recesses defined in the reflector 246. Due to this, the reflector 246 is placed in position relative to the island part 276 in the front-rear and left-right directions. Further, the reflector 246 comprises a reflective surface 280 for reflecting visible light. The reflective surface 280 comprises a first reflective surface 282 extending from the rear right side toward the front left side, a second reflective surface 284 extending in the left-right direction, and a third reflective surface 286 extending from the rear left side toward the front right side. The first reflective surface 282, the second reflective surface 284, and the third reflective surface 286 are smoothly connected to each other. Due to this, the reflective surface 280 has a shape conforming to the shape of the opening 252.

Figure 8:
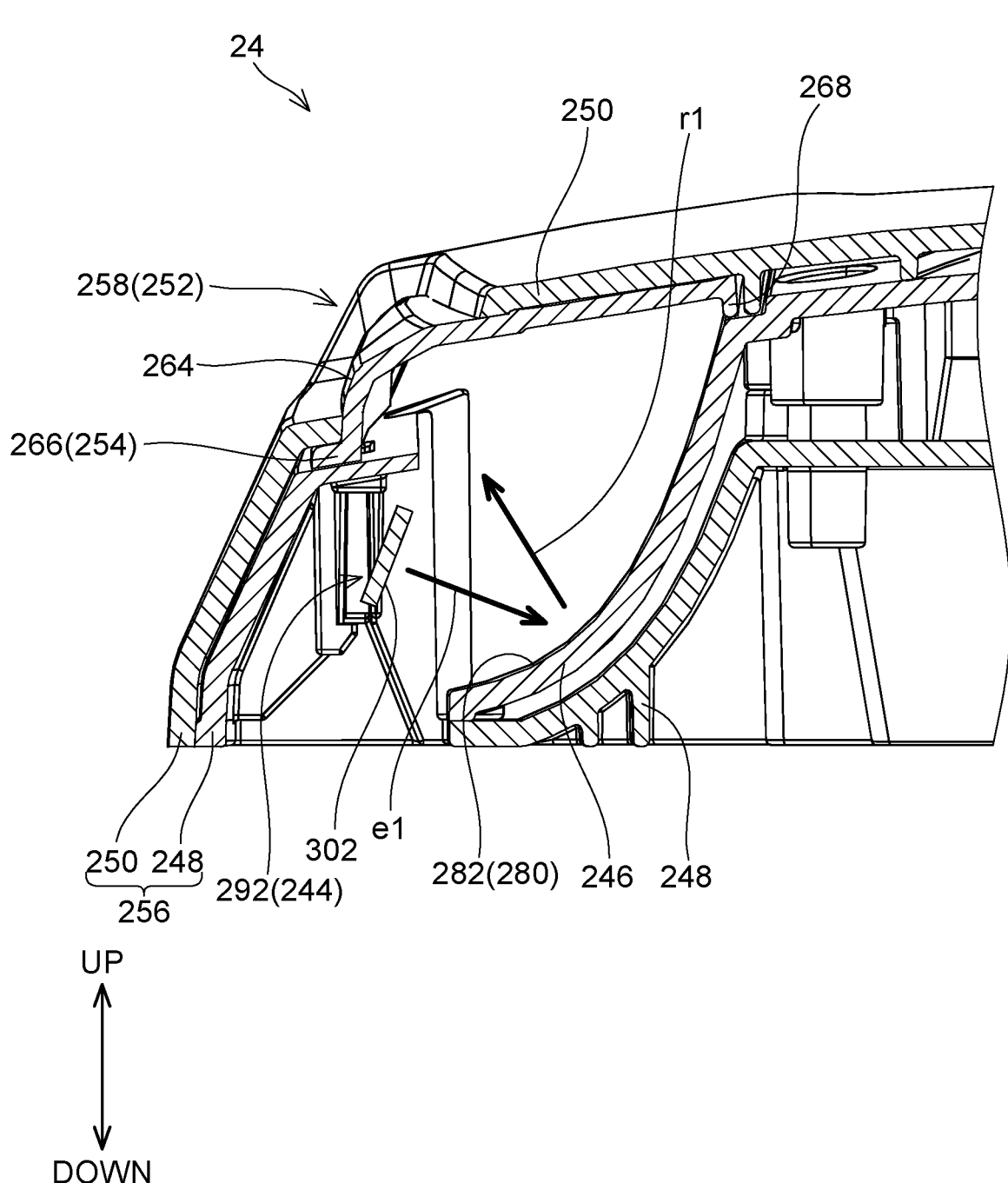
FIG. 8 illustrates a cross-sectional view of an internal structure of the display 24 according to the present embodiment along a direction perpendicular to a direction in which a first reflective surface 282 extends.

As shown in FIG. 8, the first reflective surface 282 is curved with a concave shape in a cross-section perpendicular to a direction in which the first reflective surface 282 extends. Specifically, the concave shape of the first reflective surface 282 is curved with its curvature radius increased from its upper part toward its lower part.

Figure 9:
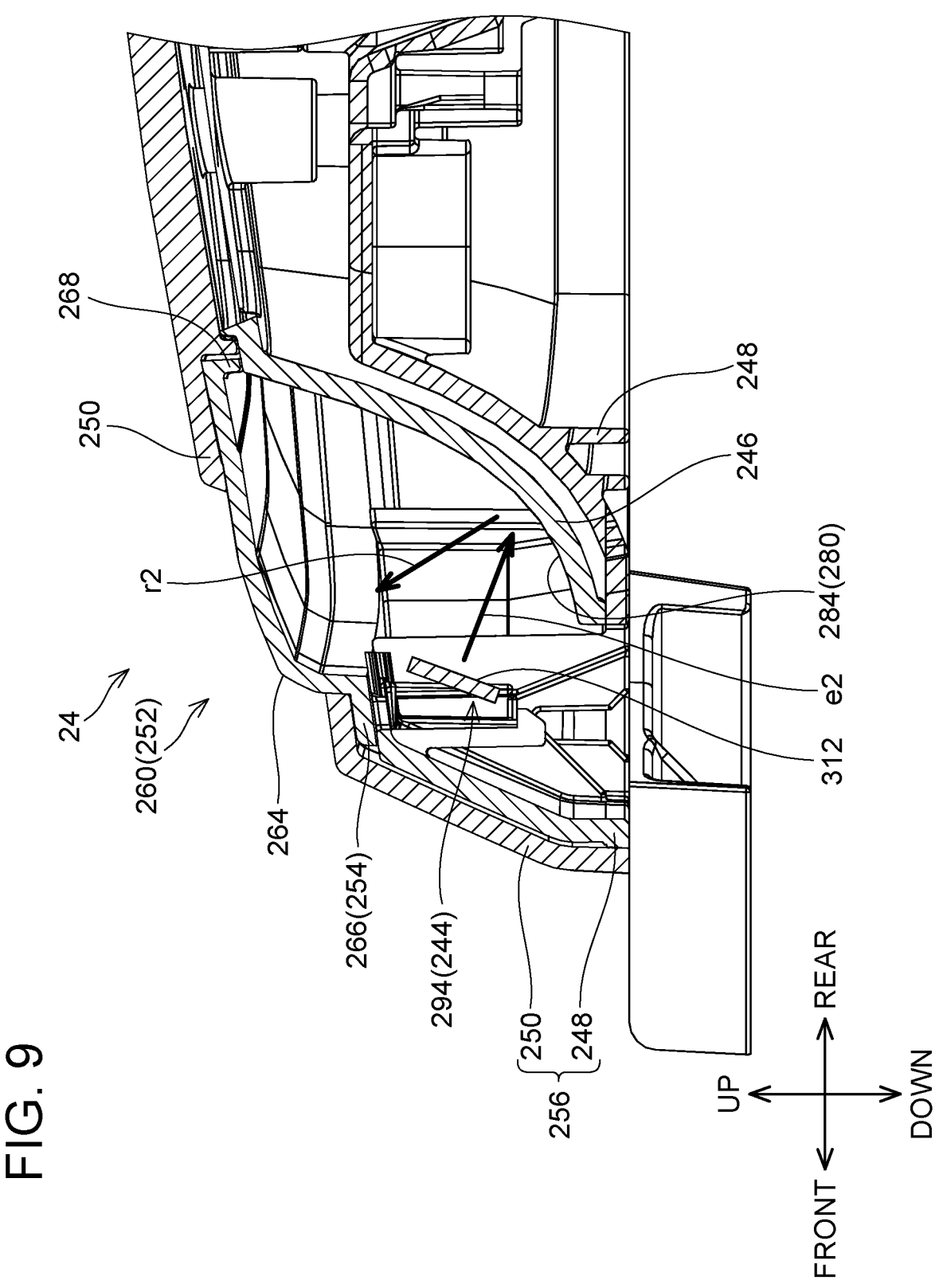
FIG. 9 illustrates a cross-sectional view of the internal structure of the display 24 according to the present embodiment along a direction perpendicular to a direction in which a second reflective surface 284 extends.

As shown in FIG. 9, the second reflective surface 284 is curved with a concave shape in a cross-section perpendicular to a direction in which the second reflective surface 284 extends. Specifically, the concave shape of the second reflective surface 284 is curved with its curvature radius increased from its upper part toward its lower part.

Figure 10:
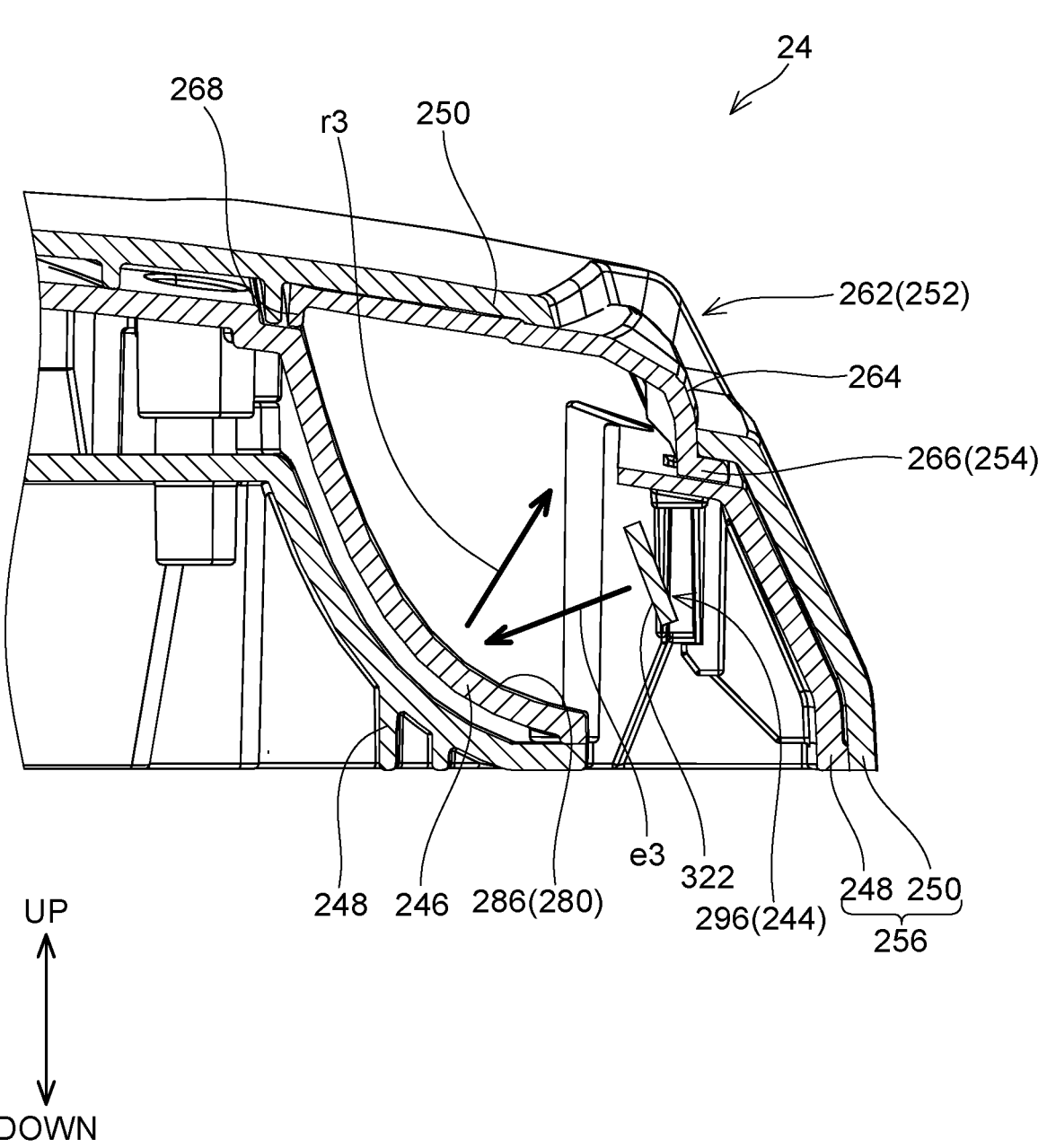
FIG. 10 illustrates a cross-sectional view of the internal structure of the display 24 according to the present embodiment along a direction perpendicular to a direction in which a third reflective surface 286 extends.

As shown in FIG. 10, the third reflective surface 286 is curved with a concave shape in a cross-section perpendicular to a direction in which the third reflective surface 286 extends. Specifically, the concave shape of the third reflective surface 286 is curved with its curvature radius increased from its upper part toward its lower part.

As shown in FIG. 7, the light source device 244 comprises a first light source device 292, a second light source device 294, and a third light source device 296. The first light source device 292, the second light source device 294, and the third light source device 296 are connected in series to the power supply circuit 144 (see FIG. 2) with electric wiring (not shown). The first light source device 292, the second light source device 294, and the third light source device 296 are fixed to the base body 248 with fixing instrument (e.g., clips). Due to this, the first light source device 292, the second light source device 294, and the third light source device 296 are held in a predetermined posture relative to the base body 248. The first light source device 292 is arranged so that a longitudinal direction of the first light source device 292 substantially coincides the direction extending from the rear right side toward the front left side. The second light source device 294 is arranged so that a longitudinal direction of the second light source device 294 substantially coincides the left-right direction. The third light source device 296 is arranged so that a longitudinal direction of the third light source device 296 substantially coincides the direction extending from the rear left side toward the front right side.

Figure 11:
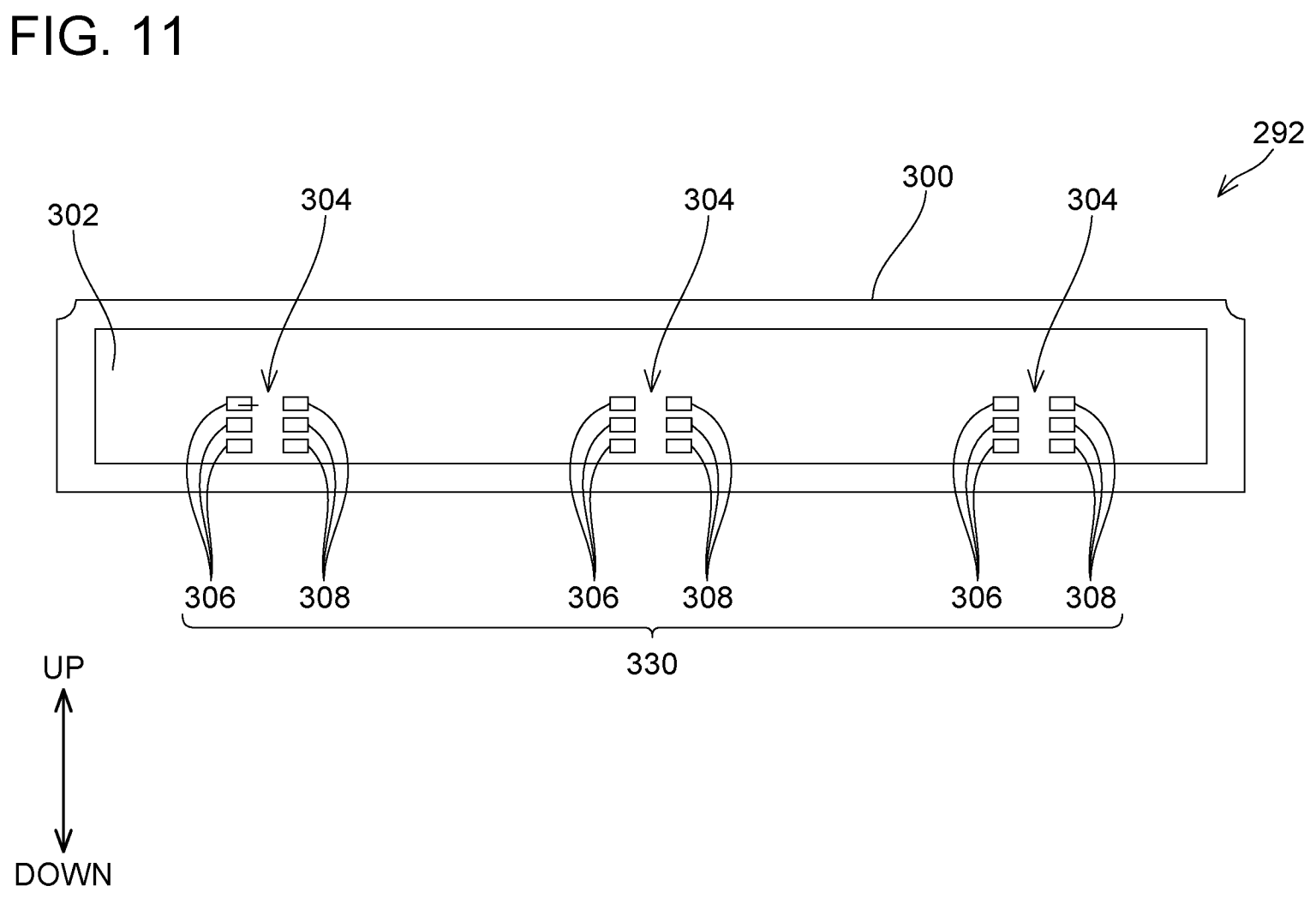

As shown in FIG. 11, the first light source device 292 comprises a circuit board 300 and three light source units 304 disposed on a component side 302 of the circuit board 300. The three light source units 304 are aligned along the longitudinal direction of the first light source device 292. Each of the three light source units 304 has three single-color LED chips 306 configured to emit white visible light and three two-color LED chips 308 configured to emit red or green visible light. As such, each of the three light source units 304 is configured to emit the visible light in white, red, or green. Further, in each of the three light source units 304, the three single-color LED chips 306 are aligned along in a short direction of the first light source device 292. Similarly, the three two-color LED chips 308 are aligned along the short direction of the first light source device 292. The three single-color LED chips 306 and the three two-color LED chips 308 are next to each other in the longitudinal direction of the first light source device 292.

The second light source device 294 and the third light source device 296 respectively have a substantially same configuration as that of the first light source device 292. Due to this, the second light source device 294 comprises a circuit board 310, a component side 312, light source units 314, single-color LED chips 316, and two-color LED chips 318, correspondingly to the configuration of the first light source device 292. The third light source device 296 comprises a circuit board 320, a component side 322, light source units 324, single-color LED chips 326, and two-color LED chips 328, correspondingly to the configuration of the first light source device 292. Although not shown, the total 54 LED chips 306, 308, 316, 318, 326, and 328 which the light source device 244 comprises are aligned along the shape of the opening 252. Hereinafter, the total 54 LED chips 306, 308, 316, 318, 326, and 328 may be collectively referred to as simply "LED chips 330".

Each of the first light source device 292, the second light source device 294, and the third light source device 296 is configured to emit the visible light in white, red, or green by using its corresponding set of light source units 304, 314, 324.

As shown in FIG. 8, an upper end of the first light source device 292 is positioned lower than a lower end of the first opening 258 and lower than an upper end of the first reflective surface 282. A lower end of the first light source device 292 is positioned higher than a lower end of the first reflective surface 282. When viewed from the first reflective surface 282, the first light source device 292 and the first opening 258 are adjacent to each other in the up-down directions. The component side 302 of the first light source device 292 is arranged facing the first reflective surface 282. A normal direction of the component side 302 is oriented to be inclined downward relative to the horizontal direction. An angle formed by the normal direction of the component side 302 relative to the horizontal direction is for example within a range of 5° to 40°, and in the present embodiment, it is 20°. Due to this, a direction e1 along which the first light source device 292 emits visible light is inclined 20° downward relative to the horizontal direction. In the present teachings, the normal direction of the component side 302 is set as the direction e1 along which the first light source device 292 emits visible light.

The first reflective surface 282 is configured to reflect the visible light emitted from the light source device 244 (mainly from the first light source device 292) toward the opening 252 (mainly toward the first opening 258). A reflecting direction r1 of the visible light from the first reflective surface 282 is inclined upward by 60° relative to the horizontal direction. In the present teachings, the reflecting direction r1 from the first reflective surface 282 is determined with the direction e1 along which the first light source device 292 emits the visible light regarded as an incident direction of the visible light.

As shown in FIG. 9, an upper end of the second light source device 294 is positioned lower than a lower end of the second opening 260 and lower than an upper end of the second reflective surface 284. A lower end of the second light source device 294 is positioned higher than a lower end of the second reflective surface 284. When viewed from the second reflective surface 284, the second light source device 294 and the second opening 260 are adjacent in the up-down directions. The component side 312 of the second light source device 294 is arranged facing the second reflective surface 284. A normal direction of the component side 312 is oriented to be inclined downward relative to the horizontal direction. An angle formed by the normal direction of the component side 312 relative to the horizontal direction is for example within a range of 5° to 40°, and in the present embodiment, it is 20°. Due to this, the direction e2 along which the second light source device 294 emits the visible light is inclined downward by 20° relative to the horizontal direction. In the present teachings, the normal direction of the component side 312 is set as the direction e2 along which the second light source device 294 emits visible light.

The second reflective surface 284 is configured to reflect the visible light emitted from the light source device 244 (mainly from the second light source device 294) toward the opening 252 (mainly toward the second opening 260). A reflecting direction r2 of the visible light from the second reflective surface 284 is inclined upward by 60° relative to the horizontal direction. In the present teachings, the reflecting direction r2 from the second reflective surface 284 is determined with the direction e2 along which the second light source device 294 emits the visible light regarded as an incident direction of the visible light.

As shown in FIG. 10, an upper end of the third light source device 296 is positioned lower than a lower end of the third opening 262 and lower than an upper end of the third reflective surface 286. A lower end of the third light source device 296 is positioned higher than a lower end of the third reflective surface 286. When viewed from the third reflective surface 286, the third light source device 296 and the third opening 262 are adjacent to each other in the up-down directions. The component side 322 of the third light source device 296 is arranged facing the third reflective surface 286. A normal direction of the component side 322 is oriented to be inclined downward relative to the horizontal direction. An angle formed by the normal direction of the component side 322 relative to the horizontal direction is for example within a range of 5° to 40° and in the present embodiment, it is 20°. Due to this, a direction e3 along which the third light source device 296 emits visible light is inclined by 20° downward relative to the horizontal direction. In the present teachings, the normal direction of the component side 322 is set as the direction e3 along which the third light source device 296 emits visible light.

The third reflective surface 286 is configured to reflect the visible light emitted from the light source device 244 (mainly from the third light source device 296) toward the opening 252 (mainly toward the third opening 262). A reflecting direction r3 of the visible light from the third reflective surface 286 is inclined upward by 60° relative to the horizontal direction. In the present teachings, the reflecting direction r3 from the third reflective surface 286 is determined with the direction e3 along which the third light source device 296 emits the visible light regarded as an incident direction of the visible light.

The display 24 causes the display surface 264 to be lit by having the visible light emitted from the light source device 244 be reflected by the reflective surface 280. The display 24 is configured to display a state related to the electrical device by causing the display surface 264 to be lit.

(PWM Control Executed by Control Device 14)

The control device 14 is configured to control current supplied to the LED chips 330 by pulse width modulation (PWM) control when the control device 14 causes the light source device 244 to emit light. In the present embodiment, a frequency for the PWM control is for example within a range of 100 Hz to 1000 Hz, and in the present embodiment, it is 130 Hz. A duty ratio of the PWM control is for example within a range of 10% to 100%, and in the present embodiment it is 50%. Due to this, as compared to when the LED chips 330 are continuously energized, illuminance of the LED chips 330 can be increased without changing the current value supplied to the LED chips 330. That is, the illuminance of the display surface 264 can be increased.

Hereinafter, a main process executed by the control device 14 will be described.

(Main Process)

When the robot lawn mower 1 is turned on via the power switch, power supply from the battery 122 of the power supply 12 to the transport device 16, the mowing device 18, the detecting mechanism 20, and the display 24 is started. When the operation activating switch is operated under the state where the power of the robot lawn mower 1 is on, the control device 14 executes the main process. When the main process has started, the control device 14 activates the transport device 16 to start transportation of the robot lawn mower 1, and also activates the mowing device 18 to start lawn mowing work by the robot lawn mower 1. When the control device 14 determines that the lawn mowing work has completed, the control device 14 causes the robot lawn mower 1 to transport to a predetermined position (e.g., position at which the main process was started). Thereafter, the control device 14 causes the transport device 16 and the mowing device 18 to stop operating, and ends the main process. Here, the control device 14 also causes the transport device 16 and the mowing device 18 to stop operating and ends the main process when an abnormal state determination flag to be described later is stored in the memory during the main process.

(Display Switching Process)

Figure 12:
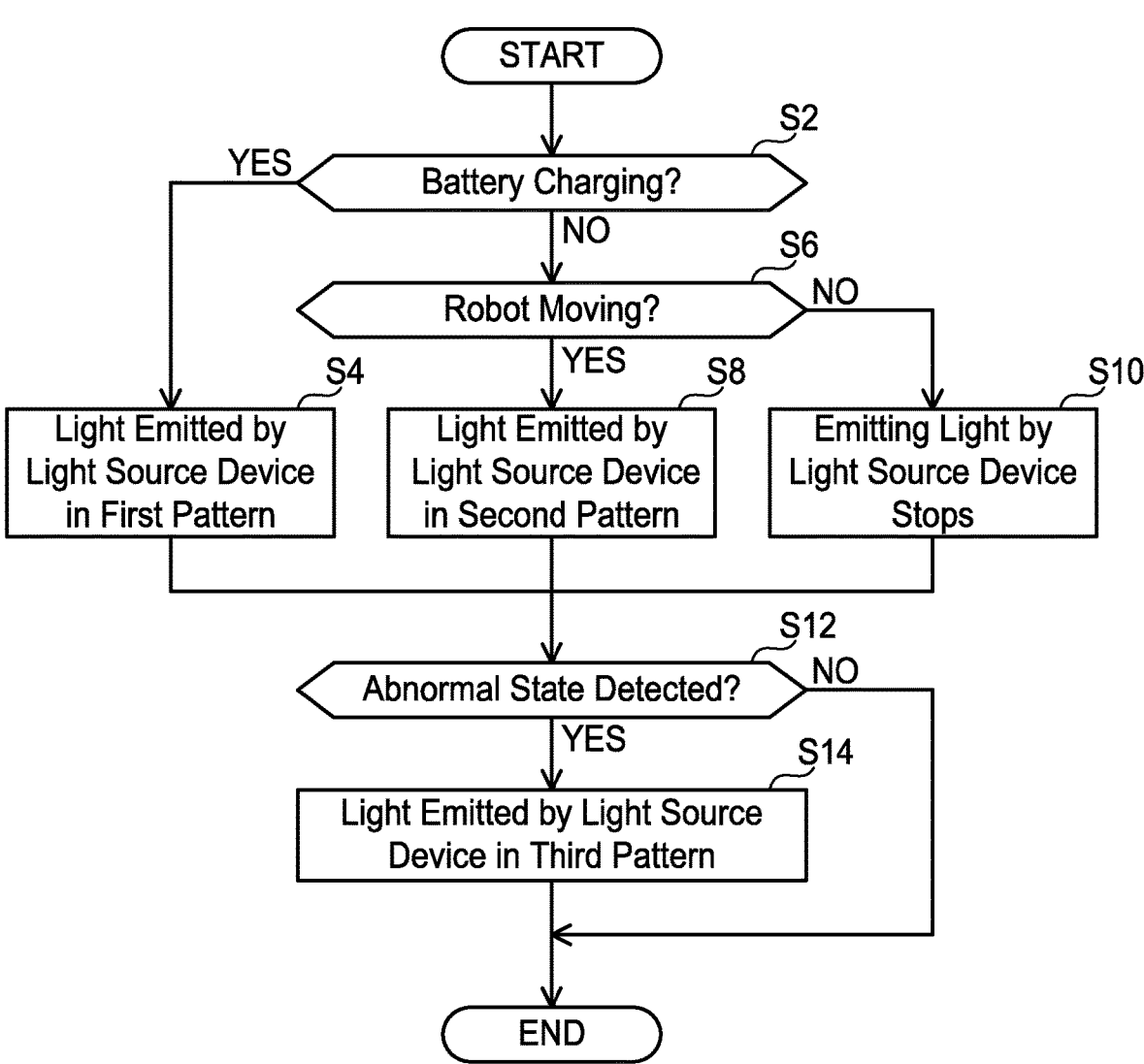
FIG. 12 illustrates a flowchart of a display switch process which a control device 14 executes in the robot lawn mower 1 according to the present embodiment.

The control device 14 repeatedly executes a display switching process shown in FIG. 12 while power is being supplied from the battery 122.

In S2, the control device 14 determines whether the battery 122 is being charged by the charger 124 or not. When the battery 122 is being charged (in case of YES), the process proceeds to S4.

In S4, the control device 14 sets a lighting pattern of the light source device 244 to a first lighting pattern, and causes the light source device 244 to be lit. The lighting pattern here means a combination of a blinking pattern of the light source device 244 and chromaticity of visible light emitted from the light source device 244. The blinking pattern mentioned here of the light source device 244 is different from a blinking of the light source device 244 which is due to the PWM control. The first lighting pattern includes the first blinking pattern and a first chromaticity. The first blinking pattern is a pattern which repeats alternately an ON duration of one second where the light source device 244 lights and an OFF duration of one second where the light source device 244 does not light. The first chromaticity is green.

In S2, when it is determined that the battery 122 is not being charged (in case of NO), the process proceeds to S6. In S6, the control device 14 determines whether the robot lawn mower 1 is transporting or not. The control device 14 determines that the robot lawn mower 1 is transporting for example when the main process is being executed. When the robot lawn mower 1 is transporting (in case of YES), the process proceeds to S8.

In S8, the control device 14 sets the lighting pattern of the light source device 244 to a second lighting pattern, and causes the light source device 244 to be lit. The second lighting pattern includes a second blinking pattern and a second chromaticity. The second blinking pattern is a pattern which repeats alternately an ON duration of 0.5 seconds where the light source device 244 lights and an OFF duration of 1.5 seconds where the light source device 244 does not light. The second chromaticity is white.

In S6, when it is determined that the robot lawn mower 1 is not transporting (in case of NO), the process proceeds to S10. In S10, the control device 14 stops the lighting by the light source device 244. When S10 has been executed, the lighting of the light source device 244 is no longer executed. Here, the control device 14 may end the process of S10 without stopping the lighting by the light source device 244 when the abnormal state determination flag to be described later is stored in the memory.

The process proceeds to S12 after S4, after S8, or after S10. In S12, the control device 14 determines whether an abnormal state of the robot lawn mower 1 is detected or not. Specifically, the control device 14 determines whether the abnormal state determination flag to be described later is stored in the memory or not. When the abnormal state of the robot lawn mower 1 is not detected (in case of NO), the process shown in FIG. 12 ends. When the abnormal state of the robot lawn mower 1 is detected (in case of YES), the process proceeds to S14.

In S14, the control device 14 sets the lighting pattern of the light source device 244 to a third lighting pattern, and causes the light source device 244 to be lit. The third lighting pattern includes a third blinking pattern and a third chromaticity. The third blinking pattern is a pattern which repeats alternately an ON duration of 0.5 seconds where the light source device 244 lights and an OFF duration of 0.5 seconds where the light source device 244 does not light. The third chromaticity is red. After S14, the process shown in FIG. 12 ends.

(Abnormality Determination Process)

Figure 13:
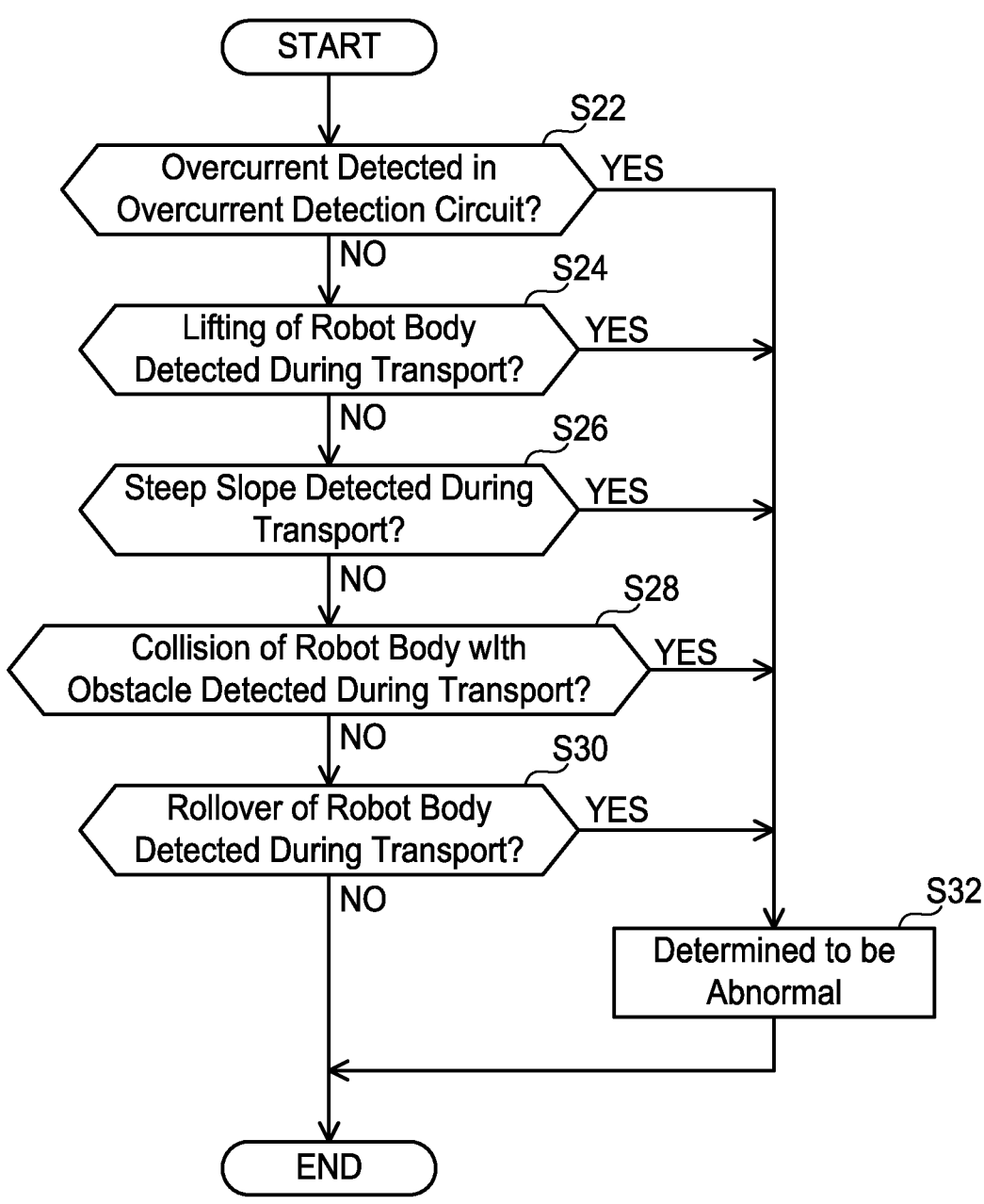
FIG. 13 illustrates a flowchart of an abnormality determination process which the control device 14 executes in the robot lawn mower 1 according to the present embodiment.

The control device 14 repeatedly executes an abnormality determination process shown in FIG. 13 while power is being supplied from the battery 122.

In S22, the control device 14 determines whether an overcurrent has been detected by the overcurrent detection circuit 212 or not. The control device 14 determines that an overcurrent has been detected by the overcurrent detection circuit 212 when the H signal is received from the overcurrent detection circuit 212. When the overcurrent is not detected by the overcurrent detection circuit 212 (in case of NO), the process proceeds to S24.

In S24, the control device 14 determines whether the robot body 2 has been lifted up from the ground G while the robot lawn mower 1 is transporting. The control device 14 determines that the robot body 2 has been lifted up from the ground G when both the H signal from the front-side inductive sensor 208 and the H signal from the rear-side inductive sensor 210 are received. When the robot lawn mower 1 is not transporting, or when it is determined that the robot body 2 has not been lifted up from the ground G (in case of NO), the process proceeds to S26.

In S26, the control device 14 determines whether the robot body 2 has tripped over a steep slope or not while the robot lawn mower 1 is transporting. The control device 14 determines that the robot body 2 has tripped over a steep slope when a state where an inclined angle of the frame 4 detected by the acceleration sensor 202 exceeds a first angle threshold (e.g., is detected for a predetermined duration (e.g., 3 seconds) or longer. When the robot lawn mower 1 is not transporting, or it is determined that the robot body 2 has not tripped over a steep slope (in case of NO), the process proceeds to S28.

In S28, the control device 14 determines whether the robot body 2 has collided with an obstacle while the robot lawn mower 1 is transporting. The control device 14 determines that the robot body 2 has collided with an obstacle when a state where at least one of the L signal from the front-side Hall sensor 204 and the L signal from the rear-side Hall sensor 206 is received is detected for a predetermined duration (e.g., 3 seconds) or longer. When the robot lawn mower 1 is not transporting, or when it is determined that the robot body 2 has not collided with an obstacle (in case of NO), the process proceeds to S30.

In S30, the control device 14 determines whether the robot body 2 has rolled over or not while the robot lawn mower 1 is transporting. The control device 14 determines that the robot body 2 has rolled over when the inclination angle of the frame 4 detected by the acceleration sensor 202 exceeds a second angle threshold (e.g., 90°). When the robot lawn mower 1 is not transporting, or when it is determined that the robot body 2 has not rolled over (in case of NO), the process shown in FIG. 13 ends.

The process proceeds to S32 when: in S22 the overcurrent is detected by the overcurrent detection circuit 212 (in case of YES); in S24, it is determined that the robot body 2 has been lifted up from the ground G while the robot lawn mower 1 is transporting (in case of YES); in S26, it is determined that the robot body 2 has tripped over a steep slope while the robot lawn mower 1 is transporting (in case of YES); in S28, it is determined that the robot body 2 has collided with an obstacle while the robot lawn mower 1 is transporting (in case of YES); or in S30, it is determined that the robot body 2 has rolled over while the robot lawn mower 1 is transporting (in case of YES). In S32, the control device 14 stores the abnormal state determination flag indicating the abnormal state of the robot lawn mower 1 in the memory. After S32, the process shown in FIG. 13 ends.

The abnormal state determination flag stored in the memory in S32 is maintained in the memory until the power supply from the battery 122 to the control device 14 is cut off. The abnormal state determination flag is deleted from the memory upon when the power supply from the battery 122 to the control device 14 is cut off.

Variants

In the above embodiment, a configuration where the electrical device is the robot lawn mower 1 comprising the mowing device 18 has been described. In another embodiment, the electrical device may be a robot cleaner comprising a cleaner device configured to collect trash such as dust instead of the mowing device 18 of the present embodiment. In yet another embodiment, the electrical device may be a rebar tying robot comprising a rebar tying device configured to tie rebars at an intersection of the rebars instead of the mowing device 18 of the present embodiment.

In the above embodiment, a configuration where the control device 14 is configured to autonomously control the transport device 16 and the electrical device functions as an autonomous mobile robot has been described. In another embodiment, the control device 14 may be configured to control the transport device 16 in accordance with an operation from a user instead of being configured to autonomously control the transport device 16. In this case, the electrical device may be a so-called cart comprising a carrier onto which various objects can be loaded.

In the above embodiment, the electrical device may not comprise the transport device 16. In this case, the electrical device may be an air compressor comprising a pressurizer device configured to pressurize air and an air tank configured to store pressurized air instead of the mowing device 18 of the present embodiment. Further, the electrical device may be a so-called food cooler or warmer comprising a heat exchanger configured to exchange heat via a heating medium and a storage space configured to accommodate beverage and/or food instead of the mowing device 18 of the present embodiment.

In the above embodiment, a configuration where the display 24 is mounted on the upper portion of the body 6 has been described. In another embodiment, the display 24 may be mounted on the front portion, the right portion, the left portion, the rear portion, or the lower portion of the body 6. In this case, the opening 252 may be open frontward, rightward, leftward, rearward, or downward.

In the above embodiment, the body 6 of the robot body 2 may be implemented as the housing body 256 of the display 24. In this case, the light source device 244 and the reflector 246 may be housed inside the body 6.

In the above embodiment, the display 24 may be disposed on the charger 124. In this case, the display 24 disposed on the charger 124 may be configured to display a remaining battery level of the battery 122 being charged by the charger 124.

In the above embodiment, a configuration where charging of the battery 122 is executed with the connection terminal of the power supply 12 and the charging terminal of the charger 124 connected with each other has been described. That is, a configuration where the battery 122 is cable-charged has been described. In another embodiment, the battery 122 may be charged wirelessly. For example, the charger 124 may be configured to receive the robot body 2 to be mounted thereon and power supply from the charger 124 to the battery 122 may be performed when the robot body 2 is mounted on the charger 124.

In the above embodiment, a configuration where the battery 122 is incorporated in the robot body 2 has been described. In another embodiment, the battery 122 may be detachably attached to the robot body 2. For example, the battery 122 may be a battery pack.

In the above embodiment, a configuration where the left transport motor 162, the right transport motor 164, and the cutting blade motor 182 are all brushless DC motors has been described. In another embodiment, at least one of the left transport motor 162, the right transport motor 164, and the cutting blade motor 182 may be another type of electric motor (e.g., brushed motor).

As an alternative to the above embodiment, material constituting the base body 248 may be replaced with a material other than polycarbonate (e.g., ABS resin). Material constituting the cover body 250 may be replaced with a material other than polycarbonate (e.g., ABS resin). In this case also, visible light transmittance of the materials the base body 248 and the cover body 250 are constituted of may be 1% or less.

As an alternative to the above embodiment, the material constituting the transmissive member 254 may be replaced with a material other than acrylic (e.g., polycarbonate, glass). In this case also, the visible light transmittance of the material constituting the transmissive member 254 may be 75% or more.

In the above embodiment, a configuration has been described in which the configuration to diffuse visible light is realized by diffusing the diffusing material within the transmissive member 254. In another embodiment, the configuration to diffuse visible light may be realized by arranging minute protrusions and recesses on a surface of the transmissive member 254. In yet another embodiment, the configuration to diffuse visible light may be realized by affixing a visible light diffusion sheet on the transmissive member 254.

As an alternative to the above embodiment, the transmissive member 254 may not be configured to diffuse visible light.

In the above embodiment, a configuration where the reflector 246 is surface-treated using metal material has been described. In another embodiment, the reflector 246 may be surface-treated using another method other than that of the above embodiment. The reflector 246 may be coated using white paint configured to reflect visible light, for example. In yet another embodiment, the reflector 246 may not be surface-treated. In this case, the reflector 246 may be constituted of light reflection grade resin (i.e., resin capable of reflecting visible light).

In the above embodiment, the shape of the opening 252 may be varied according to necessities. For example, the shape of the opening 252 may be a shape obtained by being defined through a portion of the housing body 256 in a substantially annular shape. Also, the shape of the opening 252 may be scattered. For example in this case, the opening 252 may comprise plural openings arranged in a scattered manner.

In the above embodiment, a configuration where the light source device 244 and the opening 252 are adjacent in the up-down directions as viewed from the reflective surface 280 has been described. In another embodiment, the light source device 244 and the opening 252 may be adjacent to each other in another direction other than the up-down directions (e.g., front-rear directions, left-right directions), as viewed from the reflective surface 280. In yet another embodiment, the light source device 244 and the opening 252 may be spaced from each other as viewed from the reflective surface 280.

In the above embodiment, the angle formed by the direction e1 along which the first light source device 292 emits the visible light (or by the direction e2 along which the second light source device 294 emits the visible light, or the direction e3 along which the third light source device 296 emits the visible light) relative to the horizontal direction may be varied according to necessities.

In the above embodiment, a configuration where the direction e1 along which the first light source device 292 emits the visible light, the direction e2 along which the second light source device 294 emits the visible light, and the direction e3 along which the third light source device 296 emits the visible light are all directions inclined downward relative to the horizontal direction has been described. In another embodiment, at least one of the direction e1 along which the first light source device 292 emits the visible light, the direction e2 along which the second light source device 294 emits the visible light, and the direction e3 along which the third light source device 296 emits the visible light may be a direction inclined upward relative to the horizontal direction.

In the above embodiment, the angle formed by the reflecting direction r1 of the visible light from the first reflective surface 282 (or by the reflecting direction r2 of the visible light from the second reflective surface 284, or the reflecting direction r3 of the visible light from the third reflective surface 286) relative to the horizontal direction may be varied according to necessities.

In the above embodiment, a configuration where the reflecting direction r1 of the visible light from the first reflective surface 282, the reflecting direction r2 of the visible light from the second reflective surface 284, and the reflecting direction r3 of the visible light from the third reflective surface 286 are all directions inclined upward relative to the horizontal direction has been described. In another embodiment, at least one of the reflecting direction r1 of the visible light from the first reflective surface 282, the reflecting direction r2 of the visible light from the second reflective surface 284, and the reflecting direction r3 of the visible light from the third reflective surface 286 may be a direction inclined downward relative to the horizontal direction.

In the above embodiment, a configuration where the reflective surface 280 is curved with a concave shape in the cross-section perpendicular to the direction in which the reflective surface 280 extends has been described. In another embodiment, the reflective surface 280 may be curved with a convex shape in the cross-section perpendicular to the direction in which the reflective surface 280 extends.

In the above embodiment, a configuration where the reflective surface 280 has a smooth shape has been described. In another embodiment, the reflective surface 280 may have a shape in which plural planes are coupled together.

In the above embodiment, a configuration where the light source device 244 is configured to emit visible light in white, red, or green has been described. In another embodiment, the light source device 244 may be configured to emit visible light in another chromaticity (e.g., blue) in addition to these colors.

In the above embodiment, the detecting mechanism 20 may be configured to detect another abnormal state in addition to the above mentioned states. For example, the detecting mechanism 20 may comprise an encoder configured to detect rotation of the cutting blade motor 182 and thus may detect a locked state of the cutting blade motor 182. In this case, the control device 14 may cause the light source device 244 to be lit in another lighting pattern different from the first, second, and third lighting patterns in response to detecting the locked state of the cutting blade motor 182.

In the above embodiment, the control device 14 may switch the lighting pattern of the light source device in another process different from the display switching process shown in FIG. 12. For example, the control device 14 may switch the lighting pattern of the light source device in response to a switching button (not shown) arranged on the robot body 2 being operated by the user.

(Correspondence Relationship)

As described above, the robot lawn mower 1 (an example of "electrical device") is configured to operate on supplied electric power. The robot lawn mower 1 comprises the display 24 (an example of "display") configured to display a state related to the robot lawn mower 1, the control device 14 configured to control the robot lawn mower 1, and the power supply 12 configured to supply electric power to the robot lawn mower 1. The display 24 comprises the housing 242 including the housing body 256, the opening 252, and the transmissive member 254, wherein the housing body 256 is constituted of a material having a low visible light transmittance, the opening 252 is defined through a portion of the housing body 256, and the transmissive member 254 is constituted of a material having a high visible light transmittance and covers substantially an entirety of the opening 252, the light source device 244 housed in the housing 242 and configured to emit visible light, and the reflector 246 housed in the housing 242 and having the reflective surface 280 configured to reflect the visible light emitted from the light source device 244 toward the opening 252. The control device 14 is configured to control the light source device 244 according to the state related to the robot lawn mower 1.

Generally, visible light after it is emitted from the light source device 244 spreads wider and wider as the visible light travels along a beam path from the light source device 244. In a configuration without the reflector 246, the beam path from the light source device 244 to the opening 252 is formed without any flection. A distance between the light source device 244 and the opening 252 needs to be increased to extend the beam path from the light source device 244 to the opening 252. Due to this, when the distance between the light source device 244 and the opening 252 cannot be increased, the beam path from the light source device 244 to the opening 252 might not be able to be extended sufficiently, as a result of which the visible light from the light source device 244 may not travel uniformly over to the opening 252. Contrary to this, according to the above configuration, the beam path from the light source device 244 to the opening 252 can be deflected by using the reflector 246. By deflecting the beam path from the light source device 244 to the opening 252, the beam path from the light source device 244 to the opening 252 can be extended without increasing the distance between the light source device 244 and the opening 252. Due to this, even when the distance between the light source device 244 and the opening 252 cannot be increased, the beam path from the light source device 244 to the opening 252 can be extended sufficiently, by which the visible light from the light source device 244 can be made to travel uniformly over to the opening 252. Due to this, luminance on the display surface 264 can be uniformized and thus viewability of the display 24 when it is seen from outside the housing 242 can be improved.

In one or more embodiments, the light source device 244 and the opening 252 are adjacent to each other when viewed from the reflective surface 280.

For example, if the light source device 244 and the opening 252 overlap when they are seen from the reflective surface 280, the visible light after being reflected by the reflective surface 280 may be blocked by the light source device 244, as a result of which the visible light may not travel uniformly over to the opening 252. Also, if the light source device 244 and the opening 252 are disposed apart from each other as they are seen from the reflective surface 280, a space required for accommodating the light source device 244 and the opening 252 relatively increases, which may lead to an increase in size of the housing 242. According to the above configuration, the light source device 244 can be disposed in proximity to the opening 252 within a range that would not block the visible light reflected on the reflective surface 280. Due to this, the space required for accommodating the light source device 244 and the opening 252 can be minimized, and thus the housing 242 can be made smaller in size.

In one or more embodiments, in a normal state of use of the robot lawn mower 1, the opening 252 is open substantially upward and the reflective surface 280 is configured to reflect the visible light emitted from the light source device 244 in a direction inclined upward with respect to a horizontal direction.

A general robot lawn mower 1 is typically used at a height lower than eyes of a user who is standing. Due to this, in most cases the user sees the display surface 264 of the robot lawn mower 1 from above. According to the above configuration, the visible light passing through the display surface 264 is directed to travel upward. Due to this, luminance of the display surface 264 when seen from above may be increased. Thus, visibility of the display 24 may be improved.

In one or more embodiments, the light source device 244 is below the opening 252. The light source device 244 is configured to emit visible light in a direction inclined downward with respect to the horizontal direction.

In the housing 242, there may be an extra space below the light source device 244. According to the above configuration, the beam path from the light source device 244 to the opening 252 extends toward the space below the light source device 244 and is then deflexed toward the opening 252 above the light source device 244. Due to this, the beam path from the light source device 244 to the opening 252 can be extended by utilizing the extra space within the housing 242.

In one or more embodiments, the transmissive member 254 is configured to diffuse the visible light.

According to the above configuration, the configuration to diffuse the visible light allows the luminance of the display surface 264 to be uniformized. Due to this, the viewability of the display 24 when it is seen from outside the housing 242 may be improved.

In one or more embodiments, the opening 252 includes the first opening 258 (or the second opening 260) defined through the housing body 256 along a first direction (or a second direction) and the second opening 260 (or the third opening 262) defined through the housing body 256 along the second direction (or the third direction) different from the first direction and connecting with the first opening 258 (or the second opening 260).

In cases where the above configuration is implemented, the opening 252 is complexly shaped, and thus it may be difficult for the visible light from the light source device 244 to travel uniformly over to the opening 252, as a result of which the luminance on the display surface 264 may easily become non-uniform. Due to this, the effect of uniformizing the luminance of the display surface 264 achieved by the present teachings is exhibited more prominently. In addition, according to the above configuration, the opening 252 can be shaped seamlessly to be smooth in portions of the surface of the housing 242 with height difference. Due to this, the display surface 264 may be configured with high designability.

In one or more embodiments, the opening may have an elongated shape.

When the above configuration is implemented, the opening 252 may be complexly shaped, and thus it may be difficult for the visible light to travel uniformly over to the opening 252, as a result of which the luminance on the display surface 264 may easily become non-uniform. Due to this, the effect of uniformizing the luminance on the display surface 264 achieved by the present teachings is exhibited more prominently. Further, according to the above configuration, the display surface 264 may be configured with high designability.

In one or more embodiments, the reflective surface 280 extends along a shape of the opening 252 and have a smooth shape.

For example, when the reflective surface 280 has a shape in which plural planes are connected (that is, does not have a smooth shape), an amount of the visible amount being reflected on the reflective surface 280 may easily become non-uniform. Due to this, the luminance on the display surface 264 may become non-uniform. Contrary to this, according to the above configuration, since the reflective surface 280 has the smooth shape, the amount of visible light reflected on the reflective surface 280 is less likely to become non-uniform. Due to this, the luminance on the display surface 264 can be uniformized.

In one or more embodiments, in a cross-section perpendicular to the direction in which the reflective surface 280 extends, the reflective surface 280 is curved with a concave shape.

If the visible right after being reflected by the reflective surface 280 spreads excessively wide relative to the opening 252, the amount of visible light passing through the display surface 264 may be decreased. In this case, the luminance on the display surface 264 may be decreased, and this may lead to reduced visibility of the display 24. According to the above configuration, the degree of the visible light spreading after being reflected by the reflective surface 280 can be suppressed from becoming too wide. Due to this, the amount of visible light passing through the display surface 264 can be increased. Due to this, the luminance on the display surface 264 can be increased, by which the visibility of the display 24 can be improved.

In one or more embodiments, the light source device 244 comprises the LED chips 330 (an example of a plurality of light source elements) configured to emit visible light. The LED chips 330 are aligned along the shape of the opening 252.

According to the above configuration, since the LED chips 330 are arranged along the shape of the opening 252, the visible light from the light source device 244 can easily travel uniformly over to the opening 252. Due to this, the luminance on the display surface 264 can be uniformized, and thus viewability of the display 24 when it is seen from outside the housing 242 can be improved.

In one or more embodiments, the control device 14 is configured to switch the blinking pattern of the light source device 244 according to the state related to the robot lawn mower 1. The blinking pattern includes the first blinking pattern (or the second blinking pattern, the third blinking pattern) and the second blinking pattern (or the first blinking pattern, the third pattern) different from the first blinking pattern (or the second blinking pattern, the third blinking pattern).

According to the above configuration, display variations of the display 24 can be increased. Due to this, the status of the robot lawn mower 1 can be displayed in detail.

In one or more embodiments, the control device 14 is configured to switch a chromaticity of the visible light emitted by the light source device 244 according to the state related to the robot lawn mower 1. The chromaticity of the visible light includes white (or red, green) (an example of the first chromaticity) and red (or white, green) (an example of the second chromaticity) different from white (or red, green).

According to the above configuration, display variations of the display 24 can be increased. Due to this, the status of the robot lawn mower 1 can be displayed in detail.

In one or more embodiments, the robot lawn mower 1 further comprises the detecting mechanism 20 configured to detect an abnormal state of the robot lawn mower 1. The state related to the robot lawn mower 1 includes the abnormal state of the robot lawn mower 1.

According to the above configuration, the display 24 can display the abnormal state of the robot lawn mower 1 can be displayed. Due to this, the user can be prompted to inspect the robot lawn mower 1.

In one or more embodiments, the robot lawn mower 1 further comprises the robot body 2 supporting the control device 14, the power supply 12, and the display 24, and the transport device 16 configured to transport the robot body 2. The control device 14 is configured to autonomously control the transport device 16. The robot lawn mower 1 functions as an autonomous mobile robot.

In cases where the above configuration is implemented, the robot lawn mower 1 may travel to a spot far away from the user by moving autonomously. When the robot lawn mower 1 has moved to such a spot far from the user, it becomes difficult for the user to see and read the display 24. Due to this, the effect of improving the visibility of the display 24 achieved by the present application is exhibited more prominently.

In one or more embodiments, the robot lawn mower 1 further comprises the mowing device 18 supported by the robot body 2 and configured to mow a lawn. The robot lawn mower 1 functions as an autonomous mobile robotic mower.

In cases where the electrical device is the robot lawn mower 1, the electrical device may be used outdoors. In the cases where the electrical device is used outdoors, the user has difficulty in seeing and reading the display 24 in direct sun in particular. According to the above configuration, the effect improving the visibility of the display 24 achieved by the present teachings is exhibited more prominently.

What is claimed is:

1. An electrical device configured to operate on supplied electric power, the electrical device comprising:
   a display configured to display a state related to the electrical device;
   a control device configured to control the electrical device; and a power supply configured to supply electric power to the electrical device,
wherein
the display comprises:
   a housing including a housing body, an opening, and a transmissive member, wherein the housing body is constituted of a material having a low visible light transmittance, the opening is defined through a portion of the housing body, and the transmissive member is constituted of a material having a high visible light transmittance and covers substantially an entirety of the opening;
   a light source device housed in the housing and configured to emit visible light; and
   a reflector housed in the housing and having a reflective surface configured to reflect the visible light emitted from the light source device toward the opening,
   the control device is configured to control the light source device according to the state related to the electrical device,
   in a normal state of use of the electrical device, the opening is open substantially upward and the reflective surface is configured to reflect the visible light emitted from the light source device in a direction inclined upward with respect to a horizontal direction,
   the light source device comprises a circuit board including a first surface on which a light source element is disposed and a second surface opposite to the first surface and on which a light source element is not disposed, and
   a normal direction of the first surface of the circuit board is oriented to be inclined downward relative to the horizontal direction in order to emit the visible light downward.

2. The electrical device according to claim 1, wherein the light source device and the opening are adjacent to each other when viewed from the reflective surface.

3. The electrical device according to claim 1, wherein the light source device is below the opening and configured to emit the visible light in a direction inclined downward with respect to the horizontal direction.

4. The electrical device according to claim 1, wherein the transmissive member is configured to diffuse the visible light.

5. The electrical device according to claim 1, wherein the opening includes:
   a first opening defined through the housing body along a first direction; and
   a second opening defined through the housing body along a second direction different from the first direction and connecting with the first opening.

6. The electrical device according to claim 1, wherein the opening has an elongated shape.

7. The electrical device according to claim 5, wherein the reflective surface extends along a shape of the opening and has a smooth shape.

8. The electrical device according to claim 7, wherein in a cross-section perpendicular to a direction in which the reflective surface extends, the reflective surface is curved with a concave shape.

9. The electrical device according to claim 5, wherein the light source device comprises a plurality of light source elements configured to emit visible light, and the plurality of light source elements are aligned along a shape of the opening.

10. The electrical device according to claim 1, wherein the control device is configured to switch a blinking pattern of the light source device according to the state related to the electrical device, and the blinking pattern includes a first blinking pattern and a second blinking pattern different from the first blinking pattern.

11. The electrical device according to claim 1, wherein the control device is configured to switch a chromaticity of the visible light emitted by the light source device according to the state related to the electrical device, and the chromaticity of the visible light includes a first chromaticity and a second chromaticity different from the first chromaticity.

12. The electrical device according to claim 1, further comprising a detecting mechanism configured to detect an abnormal state of the electrical device, wherein the state related to the electrical device includes the abnormal state of the electrical device.

13. The electrical device according to claim 1, further comprising:

a robot body supporting the control device, the power supply, and the display; and a transport device configured to transport the robot body, wherein the control device is configured to autonomously control the transport device, and the electrical device functions as an autonomous mobile robot.

14. The electrical device according to claim 13, further comprising a mowing device supported by the robot body and configured to mow a lawn, wherein the electrical device functions as an autonomous mobile robotic mower.

15. The electrical device according to claim 2, wherein the light source device is below the opening and configured to emit the visible light in a direction inclined downward with respect to the horizontal direction, the transmissive member is configured to diffuse the visible light, the opening includes:

a first opening defined through the housing body along a first direction; and a second opening defined through the housing body along a second direction different from the first direction and connecting with the first opening, the opening has an elongated shape, the reflective surface extends along a shape of the opening and has a smooth shape, in a cross-section perpendicular to a direction in which the reflective surface extends, the reflective surface is curved with a concave shape, the light source device comprises a plurality of light source elements configured to emit visible light, the plurality of light source elements are aligned along a shape of the opening, the control device is configured to switch a blinking pattern of the light source device according to the state related to the electrical device, the blinking pattern includes a first blinking pattern and a second blinking pattern different from the first blinking pattern, the control device is configured to switch a chromaticity of the visible light emitted by the light source device according to the state related to the electrical device, the chromaticity of the visible light includes a first chromaticity and a second chromaticity different from the first chromaticity, the electrical device further comprises a detecting mechanism configured to detect an abnormal state of the electrical device, the state related to the electrical device includes the abnormal state of the electrical device, the electrical device further comprises:

a robot body supporting the control device, the power supply, and the display; and a transport device configured to transport the robot body, the control device is configured to autonomously control the transport device, the electrical device functions as an autonomous mobile robot, the electrical device further comprises a mowing device supported by the robot body and configured to mow a lawn, and the electrical device functions as an autonomous mobile robotic mower.

16. The electrical device according to claim 1, wherein all of the visible light that reaches the opening is reflected by the reflective surface.

17. An electrical device configured to operate on supplied electric power, the electrical device comprising:

a display configured to display a state related to the electrical device;

a control device configured to control the electrical device; and a power supply configured to supply electric power to the electrical device, wherein the display comprises:

a housing including a housing body, an opening, and a transmissive member, wherein the housing body is constituted of a material having a low visible light transmittance, the opening is defined through a portion of the housing body, and the transmissive member is constituted of a material having a high visible light transmittance and covers substantially an entirety of the opening;

a light source device housed in the housing and configured to emit visible light; and a reflector housed in the housing and having a reflective surface configured to reflect the visible light emitted from the light source device toward the opening, the control device is configured to control the light source device according to the state related to the electrical device, in a normal state of use of the electrical device, the opening is open substantially upward and the reflective surface is configured to reflect the visible light emitted from the light source device in a direction inclined upward with respect to a horizontal direction, and in a cross-section taken along an up direction and a down direction, the reflective surface is curved with a concave shape whose curvature increases from an upper part toward a lower part of the reflective surface.

18. The electrical device according to claim 17, wherein all of the visible light that reaches the opening is reflected by the reflective surface.

* * * * *